(12) United States Patent
Narita

(10) Patent No.: US 8,059,212 B2
(45) Date of Patent: Nov. 15, 2011

(54) TELEVISION RECEIVER AND TELEVISION RECEIVING METHOD

(75) Inventor: Shusuke Narita, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 623 days.

(21) Appl. No.: 12/284,268

(22) Filed: Sep. 20, 2008

(65) Prior Publication Data

US 2009/0083792 A1 Mar. 26, 2009

(30) Foreign Application Priority Data

Sep. 25, 2007 (JP) ................................ 2007-247327

(51) Int. Cl.
*H04N 5/44* (2011.01)
(52) U.S. Cl. ...................................................... 348/731
(58) Field of Classification Search .................. 348/731, 348/725, 552, 553; 725/72, 68, 70, 71; 455/179.1, 455/180.1, 193.1
See application file for complete search history.

(56) References Cited

U.S. PATENT DOCUMENTS

| 7,099,644 B2* | 8/2006 | Whikehart et al. ............ 455/273 |
| 7,428,403 B2* | 9/2008 | Ramaswamy et al. ........ 455/3.01 |
| 7,509,666 B2* | 3/2009 | Takagi et al. .................... 725/72 |
| 7,561,213 B2* | 7/2009 | Okamoto ....................... 348/725 |
| 7,668,506 B2* | 2/2010 | Hoda et al. ...................... 455/25 |
| 7,685,622 B2* | 3/2010 | Stewart ............................ 725/74 |
| 7,697,913 B2* | 4/2010 | Shatara ......................... 455/296 |
| 7,936,852 B2* | 5/2011 | Lindenmeier ................. 375/347 |

FOREIGN PATENT DOCUMENTS

| JP | 2001-332991 A | 11/2001 |
| JP | 2006-042157 A | 2/2006 |
| JP | 2006-042162 A | 2/2006 |
| JP | 2006-157340 A | 6/2006 |
| JP | 2007-155381 A | 6/2007 |

* cited by examiner

*Primary Examiner* — Paulos Natnael

(74) *Attorney, Agent, or Firm* — Yokoi & Co., U.S.A., Inc.; Toshiyuki Yokoi

(57) ABSTRACT

A television receiver includes at least two tuner units that respectively connect to multidirectional antennas respectively capable of electrically switching a directivity of a receiving radio wave and that select a television broadcast signal corresponding to a channel selected by a user. The television receiver further includes an optimum direction updating section (optimum direction updating process). Thereby, when a tuner unit currently being not used is present, an optimum receive direction of the multidirectional antenna on a channel other than a channel selected in a tuner unit currently being in use is serially updated by using the tuner unit currently being not in use. Consequently, it is possible to provide the television receiver that is capable of performing the channel selection always in the optimum receive direction of the multidirectional antenna and channel selection operation quickly or in a reduced period of time in the event of the channel selection.

6 Claims, 14 Drawing Sheets

FIG.5

Channel Table Image

| Physical Channel | Virtual Channel | Optimum Direction (n) | Signal Reception |
|---|---|---|---|
| 2 | — | — | × |
| 3 | — | — | × |
| 4 | 15 | 3 | ○ |
| 5 | — | — | × |
| 6 | — | — | × |
| 7 | — | — | × |
| 8 | 30 | 10 | ○ |
| ⋮ | ⋮ | ⋮ | ⋮ |
| 16 | 2 | 0 | ○ |
| ⋮ | ⋮ | ⋮ | ⋮ |
| 20 | 65 | 1 | ○ |
| ⋮ | ⋮ | ⋮ | ⋮ |

TELEVISION RECEIVER AND TELEVISION RECEIVING METHOD

CROSS-REFERENCES TO RELATED APPLICATIONS

The present application is related to the Japan Patent Application No. 2007-247327, filed Sep. 25, 2007, the entire disclosure of which is expressly incorporated by reference herein.

BACKGROUND OF THE INVENTION

1. Field of the Invention

The present invention relates to a television receiver connected to a multidirectional antenna, and a television receiving method.

2. Description of the Related Art

As an antenna to be connected to a television receiver, a multidirectional antenna capable of electrically switching the directivity of a radio wave received by being controlled in accordance with a predetermined standard is well-known (such an antenna is commonly called a "smart antenna"). With such a multidirectional antenna used, there is executed a process in which, in the event of, for example, initialization or initial setup, while the directivity directions of the multidirectional antenna are sequentially switched, all azimuthal directions are searched. As a consequence, an optimum receive direction is set into the multidirectional antenna, and the optimum receive direction corresponding to the channel is stored into a channel table. As such, in the event of channel selection, an optimum receive direction corresponding to a selected channel is acquired from a channel table.

Further, a receiver including multiple antennas also is well-known. For example, Japanese Unexamined Patent Application Publication No. 2006-157340 ("Patent Publication 1," herebelow) discloses a television broadcast receiver that includes two antennas, in which an optimum antenna is selected. Further, Japanese Unexamined Patent Application Publication No. 2001-332991 ("Patent Publication 2," herebelow) discloses a milli-wave band transmitter that includes multiple antennas, in which the receive direction of a receive antenna is controlled corresponding to the receive state. Further, Japanese Unexamined Patent Application Publication No. 2007-155381 ("Patent Publication 3," herebelow) discloses a radar device the changes the receive direction in units of each column of an antenna element.

The optimum receive direction of the multidirectional antenna can change with, for example, weather. Especially, in the case of a channel having a low reception sensitivity, the optimum receive direction of the multidirectional antenna corresponding to the channel does not always remain unchanged. More specifically, in the case of old data stored in the channel table, there is a probability that the data does not match an optimum receive direction of an actual (present) multidirectional antenna. Hence, among other requirement, there arise a requirement that latest optimum receive directions of the multidirectional antenna is always set.

To satisfy such a requirement, various approaches can be considered. For example, one approach may be such that, in the event of channel selection, it is determined whether a good or desired signal can be acquired even in the optimum receive direction of the multidirectional antenna, of which data is stored in the channel table. As a consequence, in the event that the desired signal cannot be acquired, the all azimuthal directions are searched while the directivity direction of the multidirectional antenna is being serially switched, thereby to set the current optical receive direction is set into the multidirectional antenna.

Further, Japanese Unexamined Patent Application Publication No. 2006-42157 ("Patent Publication 4," herebelow) discloses a broadcast receiver that determines the receive direction of an antenna in each event of channel selection by a user.

According to the approach, however, there is a probability that a period of time is necessary to search for the optimum receive direction, thereby causing a delay in channel selection.

As such, a receiver developed to attempt resolution of the problem is disclosed in Japanese Unexamined Patent Application Publication No. 2006-42162 ("Patent Publication 5," herebelow). According to the receiver, an antenna switchable among 16 receive directions is used. First, two signal-receivable directions are detected through an omnidirectional searching process. Then, a searching process is executed from among three directions between two of the directions, and an optimum receive direction is determined, thereby making it possible to reduce the period of time necessary for the antenna direction searching process.

Nevertheless, however, while, as compared to the case of the omnidirectional search, the period of time necessary for the direction searching process is reduced, there is no difference from the fact that the searching process is executed to seek for the optimum receive direction. As such, there still remains the probability of causing a delay in the operation of channel selection.

Such a problem can similarly takes place even with a television receiver of the type including at least two systems of tuner units that are respectively connected to multidirectional antennas capable of electrically switching the directivity of a receive radio wave and that select and receive a television broadcast signal corresponding to a channel selected by a user. However, the cases where the multiple systems are used are limited to, for example, a case where two-screen outputting is performed, an other system other than image output systems is used for external outputting, and a case where a competitive-channel broadcast program is recorded, but the systems are not always used. As such, in order to overcome the above-described problem, it is now considered to effectively utilize the tuner unit of the system not in use.

BRIEF SUMMARY OF THE INVENTION

The present invention has been made in view of problems such as described above, and to provide a television receiver and a television receiving method that are capable of performing channel selection always in an optimum receive direction of a multidirectional antenna and channel selection operation quickly or in a reduced period of time in the event of the channel selection.

According to one embodiment (corresponding to claim 1) of the present invention, there is provided a television receiver. The television receiver is configured to include at least two tuner units that respectively connect to multidirectional antennas capable of electrically switching a directivity of a receiving radio wave and select a television broadcast signal corresponding to a channel selected by a user. The television receiver further includes an optimum direction updating section that operates, while one of the tuner unit is not in use, to update an optimum receive direction of the multidirectional antenna on a channel other than a channel selected in the other tuner unit.

According to the television receiver of the present invention, which is configured as described above, the optimum direction updating section that operates, while one of the tuner unit is not in use, to update an optimum receive direction of the multidirectional antenna on a channel other than a channel selected in the other tuner unit. Consequently, the optimum receive direction of the multidirectional antenna is always maintained to be latest.

As described above, according to the one embodiment of the present invention, the optimum receive direction of the multidirectional antenna is always maintained to be latest. Consequently, it is possible to provide the television receiving method that are capable of performing channel selection always in an optimum receive direction of a multidirectional antenna and channel selection operation quickly or in a reduced period of time in the event of the channel selection.

Preferably, the configuration according to the one embodiment may include an antenna direction searching section that searches all azimuthal directions while serially switching a directivity direction of the multidirectional antenna and that sets an optimum receive direction into the multidirectional antenna; an auto-scanning section that determines in units of each channel whether the optimum receive direction has been set by the antenna direction searching section into the multidirectional antenna and that, when a predetermined signal has been able to be demultiplexed from a television broadcast signal on a channel corresponding to the multidirectional antenna set to the optimum receive direction among respective channels, stores the optimum receive direction of the multidirectional antenna on the channel into a channel table; and a channel selection section that, in the event of channel selection, sets a frequency corresponding to a selected channel into a predetermined tuner unit, acquires an optimum receive direction of the multidirectional antenna from the channel table, and sets the optimum receive direction into the multidirectional antenna. In this case, the optimum direction updating section serially updates optimum receive directions of the multidirectional antenna on the respective channels in parallel with channel selection operations of the channel selection section, the optimum receive directions being stored in the channel table.

According to the above-described configuration of the one embodiment of the present invention, the optimum receive direction of the multidirectional antenna on the respective channel stored in the channel table is maintained to be latest. Consequently, in the event of the channel selection operation by the channel selection section, the executions of searching operations by the antenna direction searching section are minimized.

Further, preferably, the configuration may be such that, when a plurality of tuner units currently being not in use are present, the optimum direction updating section operates in a manner that the optimum receive directions of the multidirectional antenna stored in the channel table on the respective channels are updated by being shared among the plurality of tuner units currently being not in use. With the configuration thus formed, the channel table is quickly updated.

According to the above-described configuration of the one embodiment of the present invention, since the channel table is quickly updated, the executions of searching operations by the antenna direction searching section are even more minimized.

Further, preferably, the configuration may be such that when the channel selection is performed through a channel up/down operation performed by the user to select a channel in order of an arrangement of the channels in the channel table, an updating process of the channel table by the optimum direction updating section is suspended, and an optimum receive direction of the multidirectional antenna on a channel to be selected through a next channel up/down operation is updated in precedence to the next channel up/down operation by using a tuner unit currently being not in use. According to the configuration thus formed, the optimum receive direction of the multidirectional antenna on the channel to be selected through the next channel up/down operation is updated with precedence.

Further, according to the above-described configuration of the embodiment of the present invention, the optimum receive direction of the multidirectional antenna on the channel to be selected through the next channel up/down operation is updated with precedence. Hence, the configuration is enabled to satisfactorily operate in response to the event where successive channel up/down operations are carried out by the user.

Further, preferably, the configuration may be such that the next-channel updating section operates in a manner that, when the channel up/down operation is a channel up operation, an optimum receive direction of the multidirectional antenna on a channel to be selected through a next channel up operation is updated; whereas, when the channel up/down operation is a channel down operation, an optimum receive direction of the multidirectional antenna on a channel to be selected through a next channel down operation is updated. With the configuration thus formed, the optimum receive direction of the multidirectional antenna on the channel to be subsequently selected through successive identical channel up/down operations is securely updated.

Further, according to the above-described configuration of the embodiment of the present invention, the optimum receive direction of the multidirectional antenna on the channel to be subsequently selected through successive identical channel up/down operations is securely updated. Hence, the configuration is enabled to satisfactorily operate in response to the event where the successive identical channel up/down operations are carried out by the user.

Further, preferably, the configuration may be such that the next-channel updating section operates in a manner that, when a plurality of tuner units currently being not in use are present, regardless of the channel up/down operation, optimum receive directions of the multidirectional antenna on a respective channel to be selected through a next channel up operation and on a respective channel to be selected through a next channel down operation are respectively updated by using the plurality of tuner units currently being not in use. With the configuration thus formed, the optimum receive direction of the multidirectional antenna on the channel to be selected through the next channel up/down operation is securely updated.

Further, according to the above-described configuration of the embodiment of the present invention, the optimum receive direction of the multidirectional antenna on the channel to be selected through the next channel up/down operation is securely updated. Consequently, Hence, the configuration is enabled to satisfactorily operate in response to the event where successive channel up/down operations are carried out by the user.

Further, preferably, the configuration may include an antenna direction searching section that searches all azimuthal directions while serially switching a directivity direction of the multidirectional antenna and that sets an optimum receive direction into the multidirectional antenna; an auto-scanning section that determines in units of each channel whether the optimum receive direction has been set by the antenna direction searching section into the multidirectional antenna and that, when a predetermined signal has been able to be demultiplexed from a television broadcast signal on a channel corresponding to the multidirectional antenna set to the optimum receive direction among respective channels, stores the optimum receive direction of the multidirectional antenna on the channel into a channel table; a channel selection section that, in the event of channel selection, sets a frequency corresponding to a selected channel into a predetermined tuner unit, acquires an optimum receive direction of the multidirectional antenna on the selected channel from the channel table, and sets the optimum receive direction into the multidirectional antenna; and a next-channel updating section that operates in a manner that, when the channel selection is performed through a channel up/down operation performed by the user to select a channel in order of an arrangement of the channels in the channel table, an updating process of the channel table by the optimum direction updating section is suspended; when the channel up/down operation is a channel up operation, an optimum receive direction of the multidirectional antenna on a channel to be selected through a next channel up/down operation is updated in precedence to the next channel up/down operation by using a tuner unit currently being not in use; when the channel up/down operation is a channel down operation, an optimum receive direction of the multidirectional antenna on a channel to be selected through a next channel down operation is updated in precedence to the next channel down operation using the tuner unit currently being not in use. In this case, the optimum direction updating section serially updates optimum receive directions of the multidirectional antenna on the respective channels in parallel with channel selection operations of the channel selection section, the optimum receive directions being stored in the channel table; and television receiver is provided in a thin television set. With the configuration thus formed, the optimum receive direction of the multidirectional antenna on the respective channel stored in the channel table is maintained to be latest. Consequently, the optimum receive direction of the multidirectional antenna is always maintained to be latest. Particularly, in the event that the channel selection is performed through the channel up/down operation, the optimum receive direction of the multidirectional antenna on the channel to be subsequently selected through successive identical channel up/down operations is updated with precedence.

Further, according to the above-described configuration of the embodiment of the present invention, in the television receiver provided in the thin television set, the optimum receive direction of the multidirectional antenna stored in the channel table is always maintained to be latest. Hence, in the event of the channel selection operation by the channel selection section in the optimum receive direction are minimized. In particular, when the channel selection is the channel up/down operation, the optimum receive direction of the multidirectional antenna on the channel to be selected through successive identical channel up/down operations is updated in precedence. Hence, the configuration is enabled to satisfactorily operate in response to the event where successive identical channel up/down operations are carried out by the user.

Further, according to another embodiment of the present invention, there is provided a television receiver including at least two tuner units that respectively connect to multidirectional antennas respectively capable of electrically switching a directivity of a receiving radio wave and that select a television broadcast signal corresponding to a channel selected by a user. The television receiver is configured to further include a next-channel updating section that operates in a manner that, in the event of channel selection being performed by the user in order of channels through a channel up/down operation, when a tuner unit currently being not used is present, an optimum receive direction of the multidirectional antenna on a channel to be selected through the next channel up/down operation is updated in precedence to the channel up/down operation by using tuner unit currently being not in use.

In the television receiver of the embodiment of the present invention, an optimum receive direction of the multidirectional antenna on a channel to be selected through the next channel up/down operation is updated in precedence to the channel up/down operation by using tuner unit currently being not in use. Consequently, the optimum receive direction of the multidirectional antenna on the channel to be selected through the next channel up/down operation is always maintained to be latest.

Further, according to the embodiment of the present invention, the optimum receive direction of the multidirectional antenna on the channel to be selected through the next channel up/down operation is always maintained to be latest. Consequently, it is possible to provide the television receiving method that are capable of performing the channel selection operation quickly or in a reduced period of time in the event of the channel selection.

Further, preferably, the configuration may be such that the next-channel updating section operates in a manner that, when the channel up/down operation is a channel up operation, an optimum receive direction of the multidirectional antenna on a channel to be selected through a next channel up operation is updated; whereas, when the channel up/down operation is a channel down operation, an optimum receive direction of the multidirectional antenna on a channel to be selected through a next channel down operation is updated. With the configuration thus formed, the optimum receive direction of the multidirectional antenna on the channel to be subsequently selected through the successive identical channel up/down operations is securely updated.

Further, since the optimum receive direction of the multidirectional antenna on the channel to be subsequently selected through the successive identical channel up/down operations is securely updated, Hence, the configuration is enabled to satisfactorily operate in response to the event where successive identical channel up/down operations are carried out by the user.

Further, preferably, the configuration may be such that the next-channel updating section operates in a manner that, when a plurality of tuner units currently being not in use are present, regardless of the channel up/down operation, optimum receive directions of the multidirectional antenna on a respective channel to be selected through a next channel up operation and on a respective channel to be selected through a next channel down operation are respectively updated by using the plurality of tuner units currently being not in use. With the configuration thus formed, the optimum receive direction of the multidirectional antenna on the channel to be selected through the next-channel up/down operation is securely updated.

Further, when a plurality of tuner units currently being not in use are present, optimum receive directions of the multidirectional antenna on the channel to be selected through the next channel up operation is securely updated. Hence, the configuration is enabled to satisfactorily operate in response to the event where successive channel up/down operations are carried out by the user.

Further, preferably, the configuration may be applied as a configuration that operates as a processing method for use in the television receiver. More specifically, the configuration may be applied as a television receiving method for a television receiver including at least two tuner units that respectively connect to multidirectional antennas capable of electrically switching a directivity of a receiving radio wave and select a television broadcast signal corresponding to a channel selected by a user, the television receiving method comprising an optimum direction updating step, wherein, while one of the tuner unit is not in use, an optimum receive direction of the multidirectional antenna on a channel other than a channel selected in the other tuner unit is updated using the tuner being not used to receive the television broadcast signal selected by the user. Thus, together with the one embodiment (corresponding to claim 1), the configuration is disclosed herein as the television receiving method. More specifically, Hence, there should be no difference even in that the above-described configuration is effective also as the method.

Further, preferably, the configuration may be applied as a television receiving method for a television receiver including at least two tuner units that respectively connect to multidirectional antennas capable of electrically switching a directivity of a receiving radio wave and select a television broadcast signal corresponding to a channel selected by a user, the television receiving method comprising next-channel updating step wherein, in the event of channel selection being performed by the user in order of channels through a channel up/down operation, while one of the tuner unit is not in use, an optimum receive direction of the multidirectional antenna on a channel to be selected through the next channel up/down operation is updated in precedence to the channel up/down operation by using the tuner being not used to receive the television broadcast signal selected by the user.

Further, according to the above-described configuration of the present invention, a television receiving method for the television receiver having effects to those described above can be provided.

BRIEF DESCRIPTION OF THE DRAWINGS

In the accompanying drawings:

FIG. 5 is a diagram exemplifying a stored image of a channel table;

DETAILED DESCRIPTION OF THE INVENTION

Figure 1:
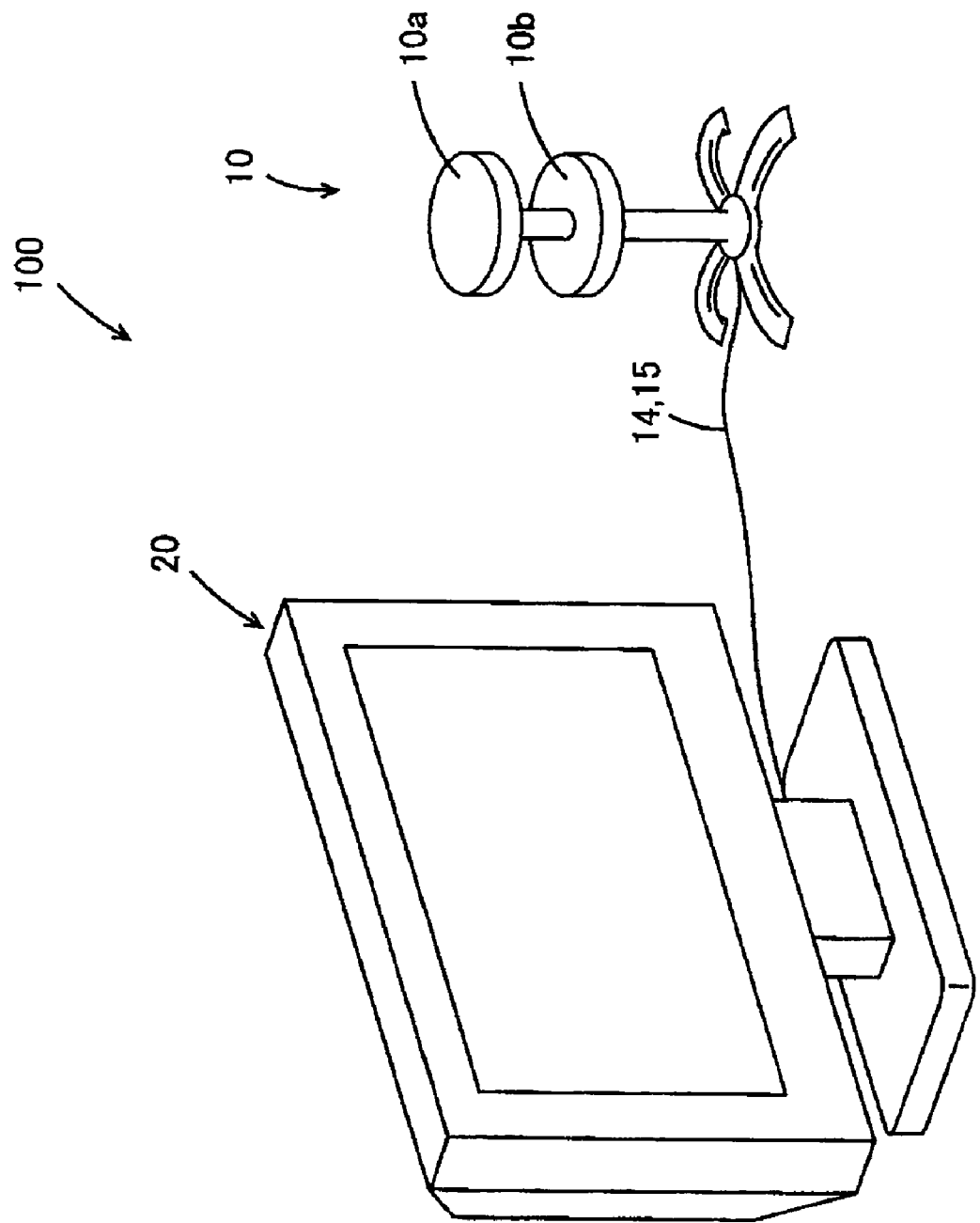
FIG. 1 is a perspective view showing one example of a thin television set to which the present invention is applied.
Figure 2:
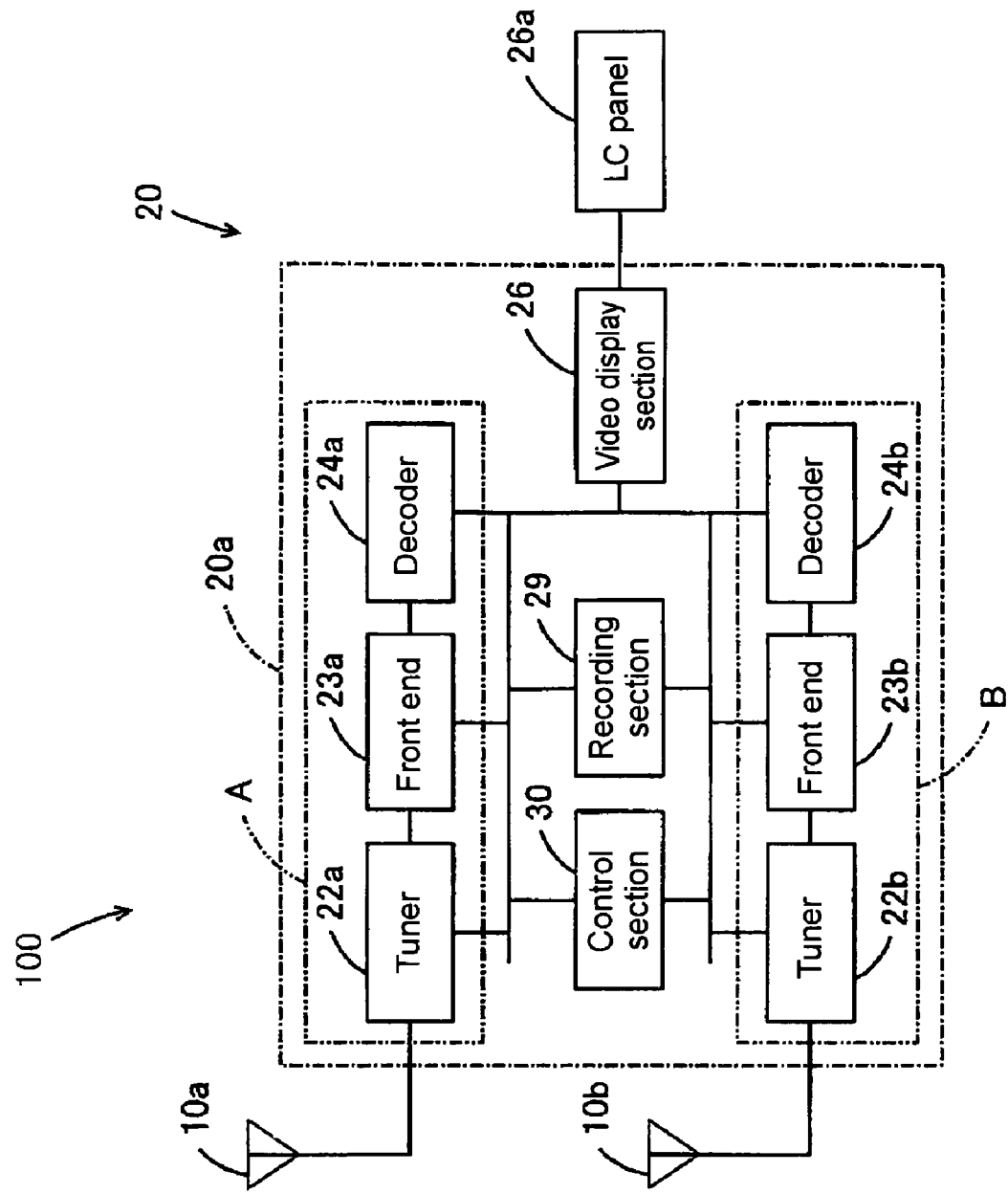
FIG. 2 is a block diagram exemplifying the configuration of the thin television set.
Figure 3:
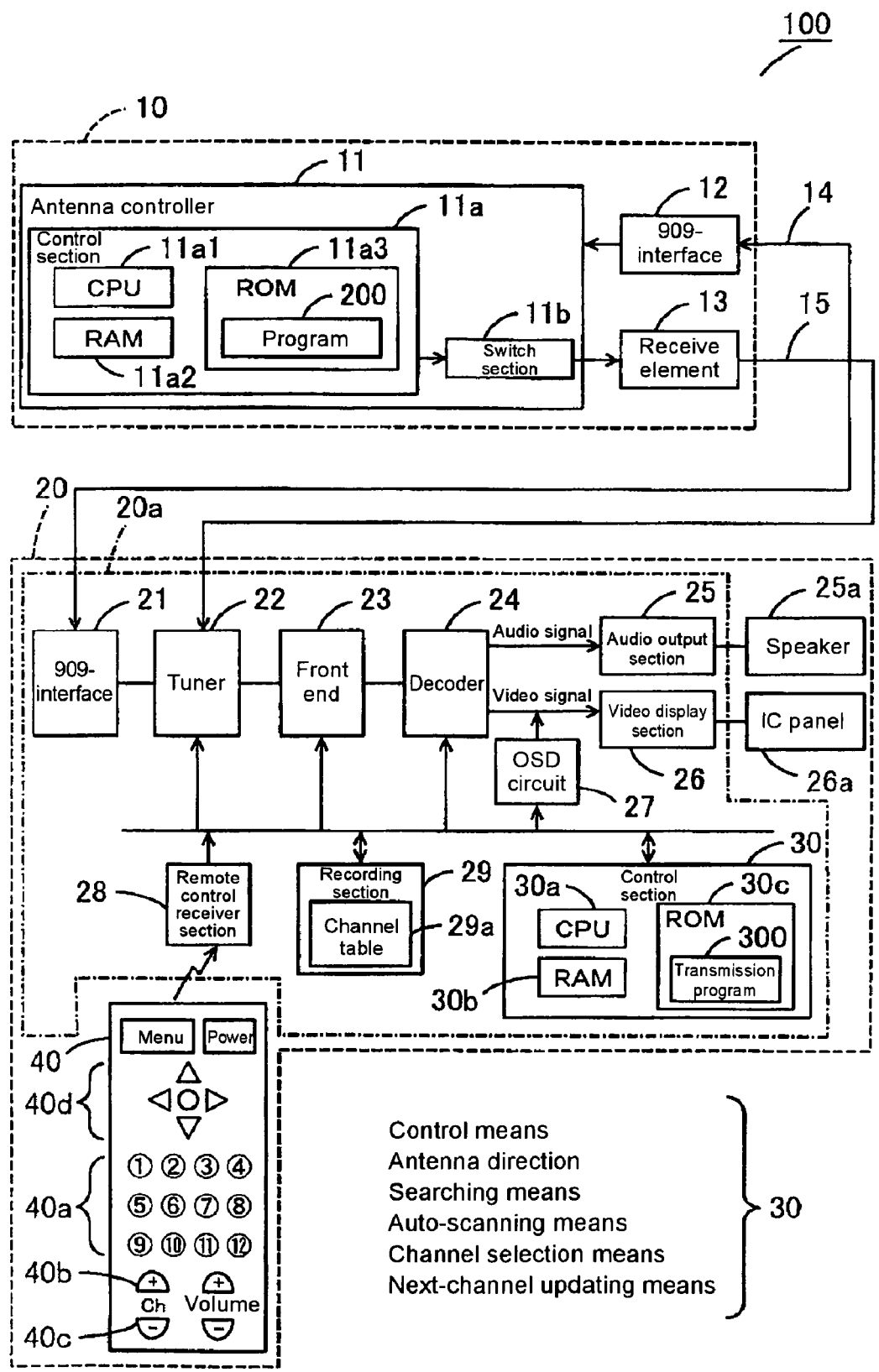
FIG. 3 is a partly enlarged view exemplifying a tuner unit of one system in the block configuration diagram shown in FIG. 2.

One embodiment of the present invention will be described herebelow with reference to the accompanying drawings in the following order:

(1) General Configuration of Thin Television Set Including Television Receiver
(2) Control Operation in Channel Selection in Television Receiver
(3) Modified Example
(4) Conclusion (1) General Configuration of Thin Television Set Including Television Receiver The general configuration of a thin television set 100 including a television receiver 20a to which the present invention is applied will be described hereinbelow with reference to FIGS. 1 to 3. FIG. 1 is a perspective view showing one example of the thin television set 100. FIG. 2 is one example of a block configuration diagram of the thin television set 100. FIG. 3 is a partly enlarged view exemplifying one tuner unit in the block configuration diagram shown in FIG. 2. The thin television set to which the present invention is applied is preferably any one of thin television sets, such as liquid crystal television sets, plasma display panel television sets, rear projection television sets, and organo-electroluminescence (EL) television sets. However, various other modified examples or embodiments can be made without departing the spirit and scope of the present invention. Further, the present invention can be applied to thin television sets, but other devices, inasmuch as the devices are configured to include at least two tuner units respectively connecting to multidirectional antennas that selectively receive a television broadcast signal corresponding to a channel selected by a user. The present invention can be further applied to, for example, video recording devices each including the television receiver described above.

With reference to FIGS. 1 to 3, the thin television set 100 is configured to include a smart antenna unit 10 including two smart antennas 10a and 10b and a television body 20. The smart antenna unit 10 and the television body 20 are interconnected through an interface for performing communication in accordance with a predetermined communication scheme (such as EIA/CEA-909 method) (the interface hereinafter will be referred to as a "909-interface"). The smart antennas 10a and 10b are each a multidirectional antenna that receives a television broadcast signal so that, for example, the directivity of a received radio wave received is electrically switchable. The television body 20 includes the television receiver 20a that includes two tuner units that, for example, are respectively connected to the smart antennas 10a and 10b and that selectively receive a television broadcast signal corresponding to a user-selected channel. Then, the tuner unit outputs a voice and video image in accordance with the television broadcast signal received in the smart antenna unit 10. According to the present embodiment, one of the tuner units, which is denoted by A, is configured from the smart antenna 10a, a tuner 22a, a front end 23a, and a decoder 24a. Similarly, the other one of the tuner units, which is denoted by B, is configured from the smart antenna 10b, a tuner 22b, a front end 23b and a decoder 24b.

The individual portions of the thin television set 100 will be described in more detail hereinbelow. However, the tuner units A and B basically have the same configuration, such that, as shown in FIG. 3, the individual portions will be described with reference to the one of the tuner units, but the individual portions of the other tuner unit will not be described.

More specifically, the smart antenna unit 10 is configured to include, for example, an antenna controller 11, a 909-interface 12, and a receive element 13 switchable in directivity in the event of receiving a digital television broadcast signal. Thereby, in the event of receiving the television broadcast signal, the smart antenna unit 10 is enabled to electrically switch the directivity of a receivable television broadcast signal. Further, in the present embodiment, the smart antenna unit 10 is configured in the manner that the smart antenna 10a and the smart antenna 10b are disposed, for example, in a vertical arrangement to prevent misalignment of the relative positions in the directivity directions of the respective receive elements 13.

The 909-interface 12 is electrically connected to, for example, to a 909-interface 21 of the television body 20 via a cable 14. The 909-interface 12 performs communication with the 909-interface 21 of the television body 20 in accordance with a predetermined communication method (such as EIA/CEA-909), receives, for example, channel information necessary to control the receive element 13 from the television body 20, and outputs the information to the antenna controller 11.

The antenna controller 11 includes a control section 11a, for example. The control section 11a includes a CPU 11a1, a RAM 11a2, and a ROM 11a3, for example. The CPU 11a1 performs various control operations in accordance with various processing programs dedicated for the antenna controller 11 and recorded or stored in the ROM 11a3. The RAM 11a2 includes, for example, program storage areas and data storage areas. The program storage area is used to expand the respective processing programs for execution by the CPU 11a1, and the data storage area is used to store, for example, input data and the data of various results produced in the execution of the respective processing programs. The ROM 11a3 stores therein, for example, a system program executable by the antenna controller 11; respective processing programs executable under the system program; data to be used in the execution of the respective processing programs, and the data of various results produced in arithmetic processing of the CPU 11a1. A program 200 is recorded in the ROM 11a3 in the form of a computer-readable program code.

The program 200 causes, for example, electrical switching of the directivity of the receive element 13 in accordance with a television broadcast signal corresponding to a physical channel number (frequency) contained in channel information acquired by the CPU 11a1. More specifically, in accordance with a determination regarding a television broadcast signal corresponding to a physical channel number contained in channel information acquired by the CPU 11a1 that has executed the program 200, the program 200 causes switching of the directivity of the receive element 13 working as an antenna that receives the television broadcast signal.

For example, in the event that the receive element 13 has been selected by the CPU 11a1, which has executed the program 200, in accordance with a control signal input from the control section 11a, the directivity of the receive element 13 is switched in accordance with a directivity direction acquired by the CPU 11a1, which has executed the program 200.

Figure 4:
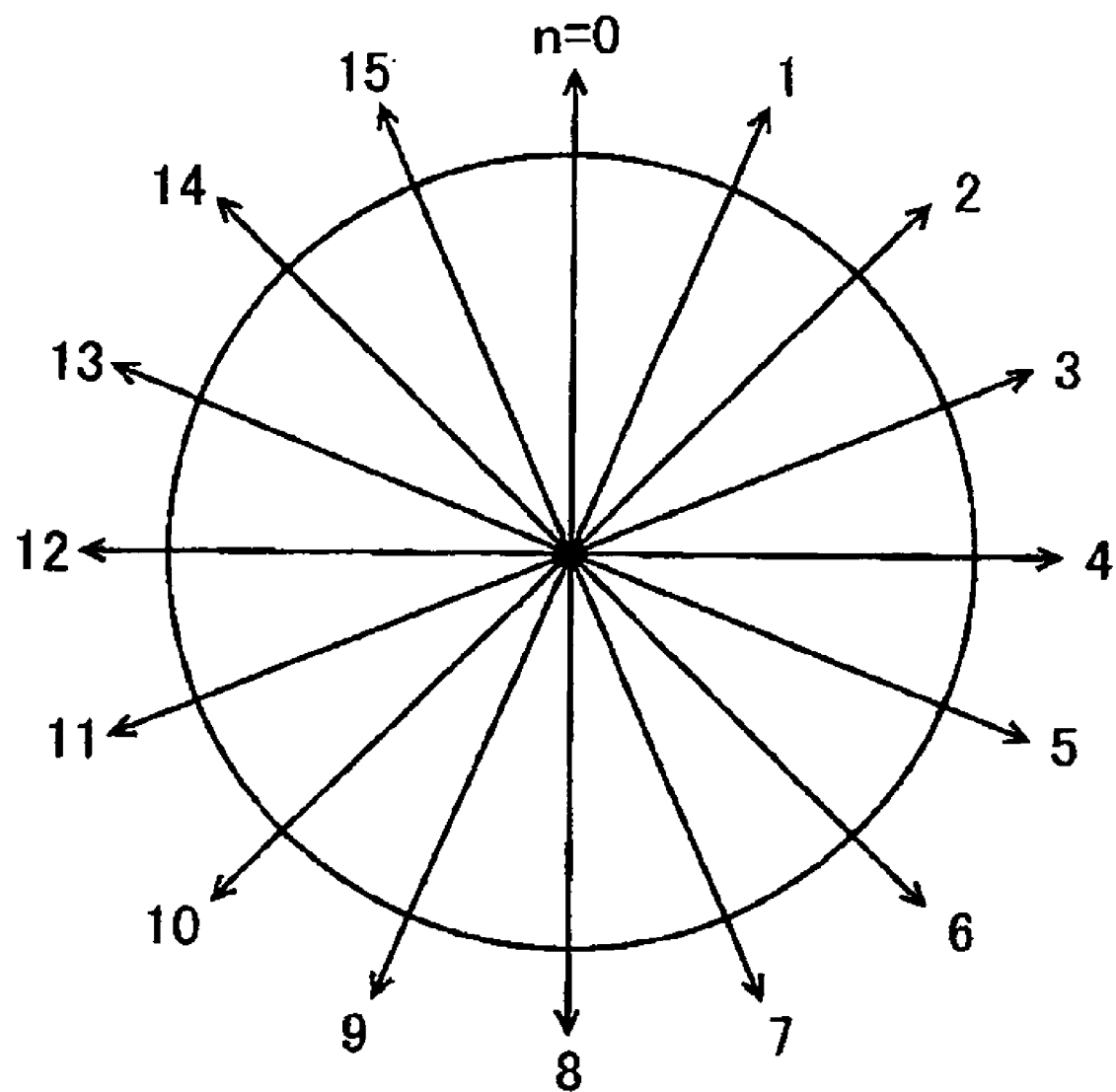
FIG. 4 is a diagram exemplifying directivity directions of a receive element.

The receive element 13 is, for example, connected to a tuner 22 of the television body 20 by an antenna RF cable 15, and receives a television broadcast signal in accordance with an instruction of the CPU 11a1, which has executed the program 200. More specifically, the receive element 13 has directions corresponding to multiple directivities (simply, "directivity direction(s)," hereinbelow) for receiving a television broadcast signal. In this case, in the event that the directivity is switched by the switch section 11b to one of the multiple directions, a higher sensitivity than those of television broadcast signals received from other direction is indicated in the television broadcast signal from one of the directions. FIG. 4 is a view showing one example set of directivity directions of the receive element 13. The figure shows that the receive element 13 has, for example, sixteen directions, namely directivity directions n0 to n15 (i.e., n=0 to 15).

The television body 20 is configured to include the television receiver 20a that includes, but not limited to, the 909-interface 21, the tuner 22, a front end 23, a decoder 24, an audio output section 25, a video display section 26, an OSD (on-screen display) circuit 27, a remote control receiver section 28, a recording section 29, and a control section 30. The television body 20 further includes, but not limited to, a speaker 25a that outputs audio sounds, an LC (liquid crystal) panel 26a that outputs video images, and a remote controller 40 that is dedicated for the television body 20 and that is communicable with the remote control receiver section 28.

The 909-interface 21 is electrically connected to, for example, the 909-interface 12 of the smart antenna unit 10 through the cable 14. The 909-interface 21 performs communication based on a predetermined communication method (such as EIA/CEA-909) with the 909-interface 12 of the smart antenna unit 10 in accordance with a control signal input from the control section 30.

The tuner 22 is electrically connected to, for example, the receive element 13 of the smart antenna unit 10 through the antenna RF cable 15. For example, the tuner 22 acquires a TV broadcast signal corresponding to a user-selected channel from among TV broadcast signals having been output from the receive element 13 in accordance with a control signal input from the control unit 30, and then outputs the TV broadcast signal to the front end 23.

The front end 23 converts, for example, a TV broadcast signal, which has been output from the tuner 22, into an intermediate frequency signal in accordance with a control signal input from the control unit 30, and outputs the converted TV broadcast signal to the decoder 24.

The decoder 24 performs processing corresponding to a predetermined file format (such as an MPEG-2 (Moving Picture Experts Group phase 2) format) on a TV broadcast signal output from the front end 23, in accordance with a control signal input from the control unit 30. Thereby, the decoder 24 demultiplexes the TV broadcast signal into an audio signal and a video signal and decodes the respective signals. Then, the decoder 24 outputs the decoded audio signal to the audio output section 25, and outputs the decoded video signal to the video display section 26.

The audio output section 25 causes the speaker 25a to output an audio sound corresponding to speech data based on a speech signal output from the decoder 24.

The video display section 26 causes the LC panel 26a to display video images thereon. The video images to be displayed includes, for example, a video image corresponding to video data based on the video signal output from the decoder 24, and a video image corresponding to video data based on the video signal output from the decoder 24 and combined by the OSD circuit 27 with an OSD display signal (described further below).

The OSD circuit 27 combines (superimposes), for example, a predetermined OSD display signal causing the video display section 26 to perform OSD display with a video signal output from the decoder 24, in accordance with a control signal input from the control unit 30.

The remote control receiver section 28, for example, receives various signals sent from the remote controller 40, and outputs various types of data based on the received various signals to the control unit 30.

The remote controller 40, for example, is operated by the user, and sends to the remote control receiver section 28 a signal corresponding to the operation. More specifically, the remote controller 40 includes, but not limited to, channel keys 40a, a channel up key 40b, a channel down key 40c, a channel selection/determination key 40d that is used in the event of determining various setups or specifications.

The recording section 29 is configured from, for example, a magnetic storage medium, an optical storage medium, or a semiconductor memory. More specifically, the recording section 29 records (stores) therein a channel table 29a, for example. In the channel table 29a, channel information and the like are recorded (or stored), as shown in FIG. 5. More specifically, in the channel table 29a, various items of information are stored correlation to one another. The information are, for example, virtual channel numbers allocated to, for example, the channel keys 40a and channel up/down keys 40b and 40c of the remote controller 40; physical channel numbers; direction information pertaining to the directivity directions of the smart antenna unit 10 (optimum receive directions of corresponding channels); gain information pertaining to the gains of the smart antenna unit 10. For example, the information to be recorded in the channel table 29a are determined in a well-known initial setup process by the antenna system 100 to be stored into the channel table 29a.

The control unit 30 includes, but not limited to, a CPU 30a, a RAM 30b, and a ROM 30c. The CPU 30a performs various control operations in accordance with the various processing programs dedicated for the television body 20 and stored in the ROM 30c. The RAM 30b includes a program storage area and a data storage area, for example. The program storage area is used to expand the respective processing programs for execution by the CPU 30a. The data storage area is used to store, for example, the input data and the data of various results produced in the execution of the respective processing programs.

The ROM 30c stores therein, but not limited to, the system program that can be executed in the television body 20, the various processing programs executable under the system program, data to be used in the execution of the various processing programs, the data of various results of arithmetic processing of the CPU 30a. The programs are each stored in the ROM 30c in the form of computer-readable program code. More specifically, the ROM 30c stores therein, for example, a transmission program 300.

The transmission program 300, for example, causes the CPU 30a to implement the function of transmitting channel information to the smart antenna unit 10 through the 909-interface 21. More specifically, for example, when a channel is selected through, for example, the operation of the channel keys 40a and channel up/down keys 40b and 40c of the remote controller 40 by the user, the CPU 30a operates as follows. The CPU 30a acquires channel information (a physical channel number, direction information, and gain information, for example) corresponding to a channel number (virtual channel number) of the selected channel from the channel table 29a of the recording section 29. Then, the CPU 30a transmits the acquired channel information to the antenna controller 11 of the smart antenna unit 10 through the 909-interface 21. Thereby, the smart antenna unit 10 receives a television broadcast signal by selecting the directivity thereof.

(2) Control Operation in Channel Selection in Television Receiver

Figure 6:
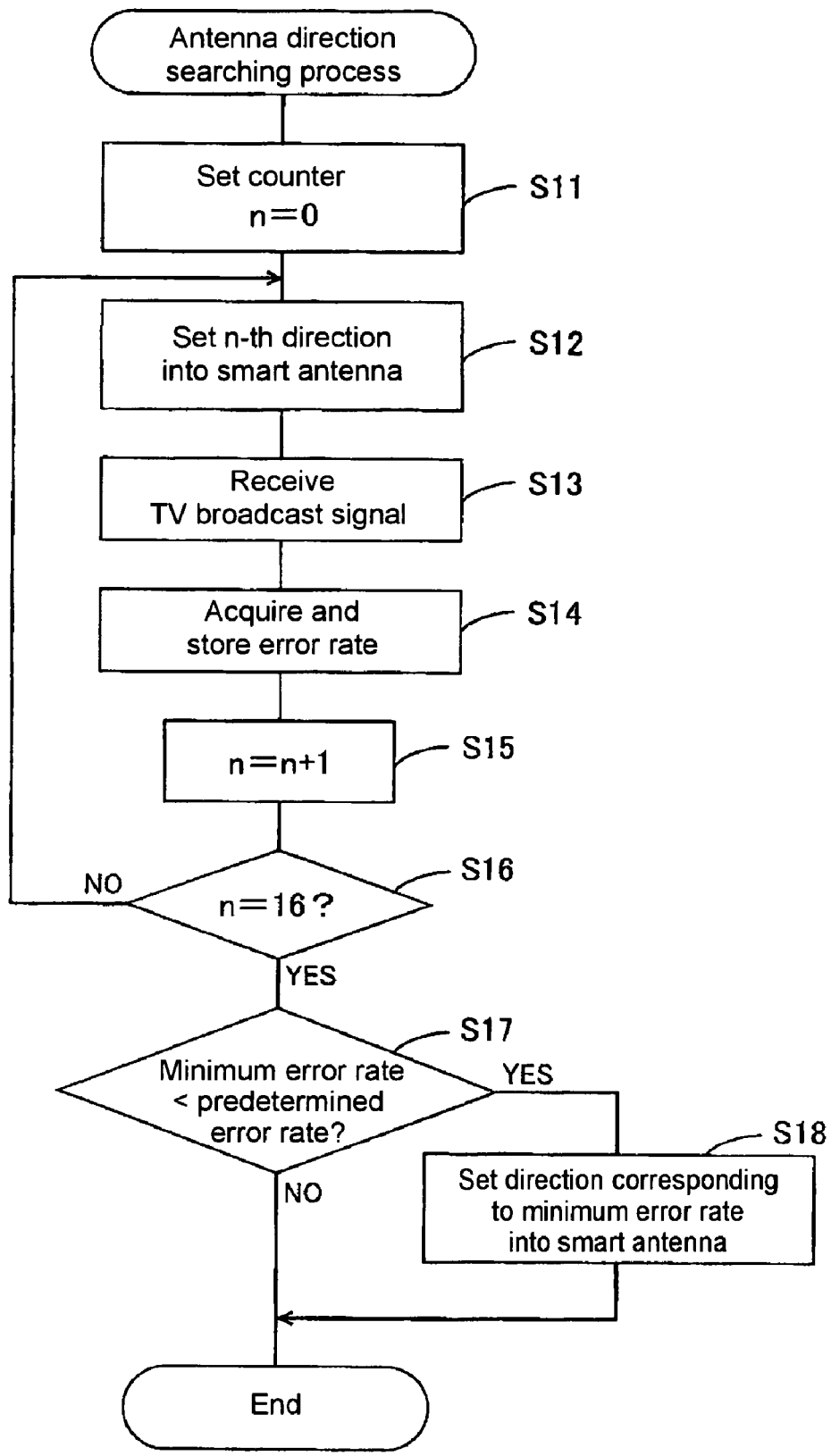
FIG. 6 is a flow chart representing a control operation (antenna direction searching process) that is executed in the event of, for example, storing an optimum receive direction of a smart antenna unit into the channel table.

FIG. 6 is a flow chart representing a control operation (antenna direction searching process) that is executed in the event of, for example, storing an optimum receive direction of the smart antenna unit 10 into the channel table 29a.

With reference to FIG. 6, first, when the direction searching process is started, a counter n corresponding to the directivity directions n0 to n15 is set to 0 (set as n=0) (step S11). Then, the n-th direction is set to the directivity direction of the receive element 13 (step S12). Then, a television broadcast signal corresponding to the channel set into the tuner unit in association with the directivity direction of the receive element 13 set at step S12 is received (step S13). Then, an error rate in the television broadcast signal received at step S13 is acquired and stored into, for example, the RAM 30b by being correlated to the directivity direction of the receive element 13 set at step S12 (step S14). Then, the counter n is implemented by one (step S15). Then, it is determined whether the counter n implement at step S15 is 16 (step S16). If the counter n is not yet 16, and hence the result of the determination at step S16 is negative, step S12 and the subsequent steps are iteratively executed. Otherwise, in the event that the counter n has reached 16, that is, in the event that error rates in all azimuthal directions of the receive element 13 corresponding to the channel set in the tuner unit have been detected, and hence the result of the determination at step S16 is affirmative, then a following determination is made. The determination is made as to whether a minimum error rate among those stored into the RAM 30b in the channel is less than a predetermined error rate experimentally obtained so that the television broadcast signal can be satisfactorily received (step S17). In the event that the minimum error rate is greater than or equal to the predetermined error rate, and hence the determination at step S17 is negative, then the present routine is terminated (ended). Otherwise, in the event that the result of the determination at step S17 is affirmative, then a directivity direction corresponding to the minimum error rate in the channel is set as an optimum receive direction of the smart antenna unit 10 (step S18).

The antenna direction searching process shown in FIG. 6 corresponds to an antenna direction searching section that searches the all azimuthal directions while serially changing the directivity direction of the smart antenna unit 10, and sets an optimum receive direction thereof into the smart antenna unit 10. The antenna direction searching section is implemented as a function of the control section 30.

Figure 7:
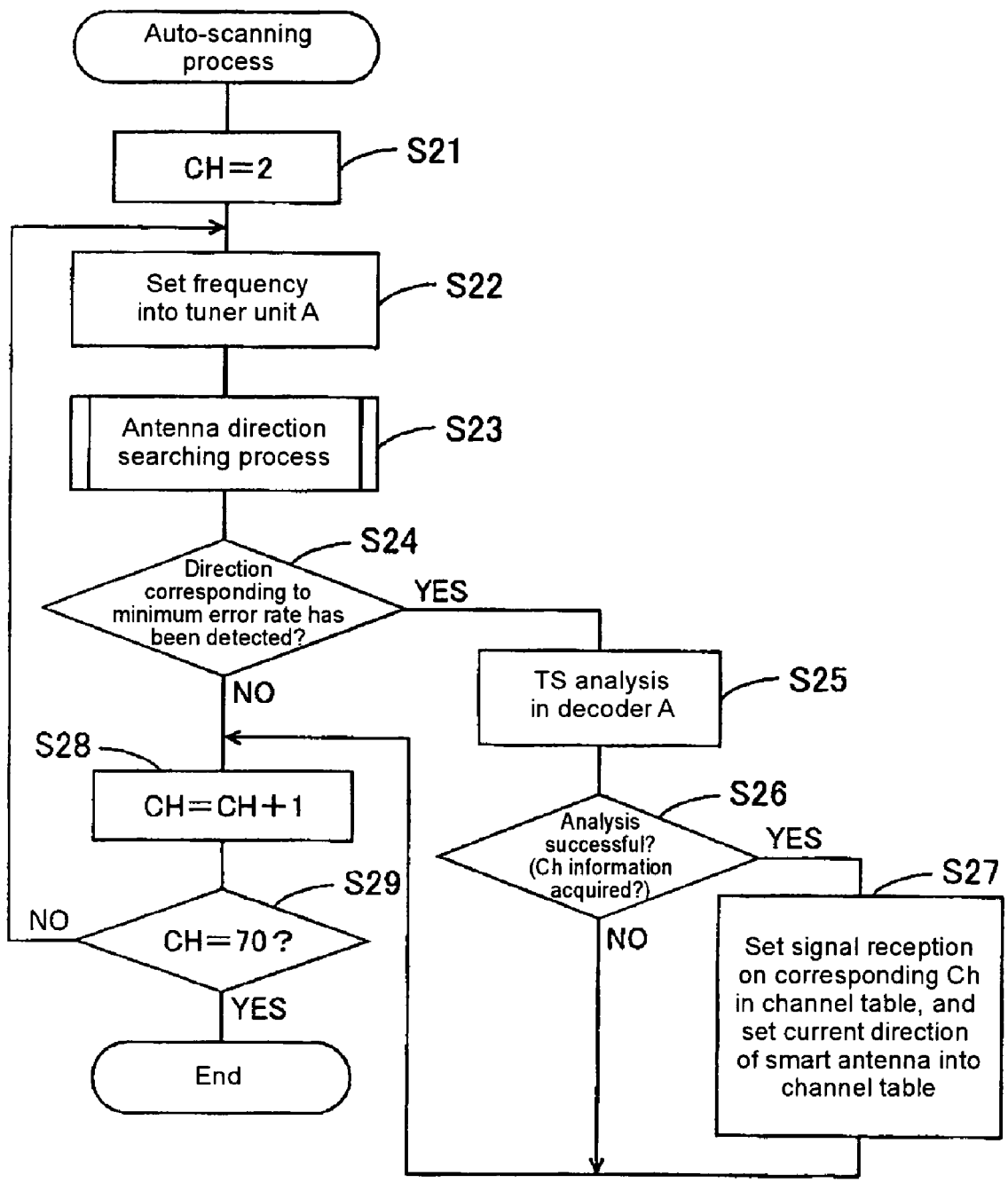
FIG. 7 is a flow chart representing a control operation (auto-scanning process) that is executed in a well-known initial setup (initialization) process to record information into the channel table in the event of using the smart antenna unit.

FIG. 7 is a flow chart representing a control operation (auto-scanning process) that is executed in a well-known initial setup (initialization) process to record information into the channel table 29*a* in the event of using the smart antenna unit 10.

With reference to FIG. 7, first, when the auto-scanning process is started, there is set to a minimum value of likely-receivable physical channel numbers (frequencies) of television broadcast signals. For example, in the case where likely-receivable physical channel numbers are physical channels Ch2 to Ch69, the physical channel CH (count value parameter) is set to 2 (set as CH=2) (step S21). Then, a frequency corresponding to the physical channel CH set at step S21 is set into, for example, the tuner unit A (the frequency may be set to any one of the tuner units) (step S22). Then, the antenna direction searching process shown in FIG. 6 is executed (step S23). Subsequently, it is determined whether a directivity direction corresponding to a minimum error rate has been detected in the physical channel CH set into the tuner unit A. More specifically, it is determined whether a satisfactorily-receivable television broadcast signal has been acquired. For example, it is determined whether the result of the determination at step S17 in the antenna direction searching process executed at step S23 is affirmative (step S24).

In the event that the directivity direction corresponding to the minimum error rate has been detected, and hence the result of the determination at step S24 is affirmative, then the television broadcast signal (TS (transport stream) packets contained in a terrestrial digital broadcast signal, for example) is analyzed by the decoder 24*a* (step S25). Subsequently, it is determined whether the analysis of the TS packets at step S25 is successful. For example, it is determined whether an audio signal (audio data) in a predetermined file format (MPEG-2 format, for example) or a video signal (video data) has been acquired (extracted) by the decoder 24*a* in the physical channel CH set into the tuner unit A (step S26). In the event the analysis of the TS packets is successful and hence the result of the determination at step S26 is affirmative, then, in a corresponding channel (that is, the physical channel CH set into the tuner unit A) of the channel table 29*a*, the state is set (stored) as "O" indicative that a signal reception is a satisfactory reception. In addition, the current direction of the smart antenna unit 10 (the direction corresponding to the minimum error rate set at step S18 in FIG. 6) is set (stored) as an optimum receive direction of the smart antenna unit 10 (step S27). Otherwise, in the event that either the result of the determination at step S24 or the result of the determination at step S26 is negative, then in the corresponding channel of the channel table 29*a*, the state is set (stored) as "x" indicative of that the signal reception is a reception fault.

Subsequently, one is added to the physical channel CH (step S28). Then, it is determined whether the physical channel CH to which one has been added at step S28 is a value obtained by adding one to a maximum value of the physical channel numbers (frequencies) of the television broadcast signal likely receivable in the physical Ch. For example, the likely-receivable physical channel numbers are physical Ch2 to Ch69, it is determined whether the physical channel CH is 70 (step S29). In the event that the physical channel CH has not yet reached 70 and hence the result of the determination at step S29 is negative, then step S22 and the subsequent steps are iteratively executed. However, the result of the determination at step S29 is affirmative, the present routine is terminated.

Thus, the auto-scanning process shown in FIG. 7 corresponds to an auto-scanning section and is implemented as a function of the control section 30. According to the auto-scanning section, it is determined in units of each channel whether the optimum receive direction has been set into the smart antenna unit 10 by the antenna direction searching section (corresponding to the antenna direction searching process shown in FIG. 6). In the event that a predetermined signal has been able to be demultiplexed from a television broadcast signal on a channel corresponding to the multidirectional antenna set to the optimum receive direction among those on the respective channels, the optimum receive direction of the smart antenna unit 10 on the channel is stored into the channel table 29*a*.

Figure 8:
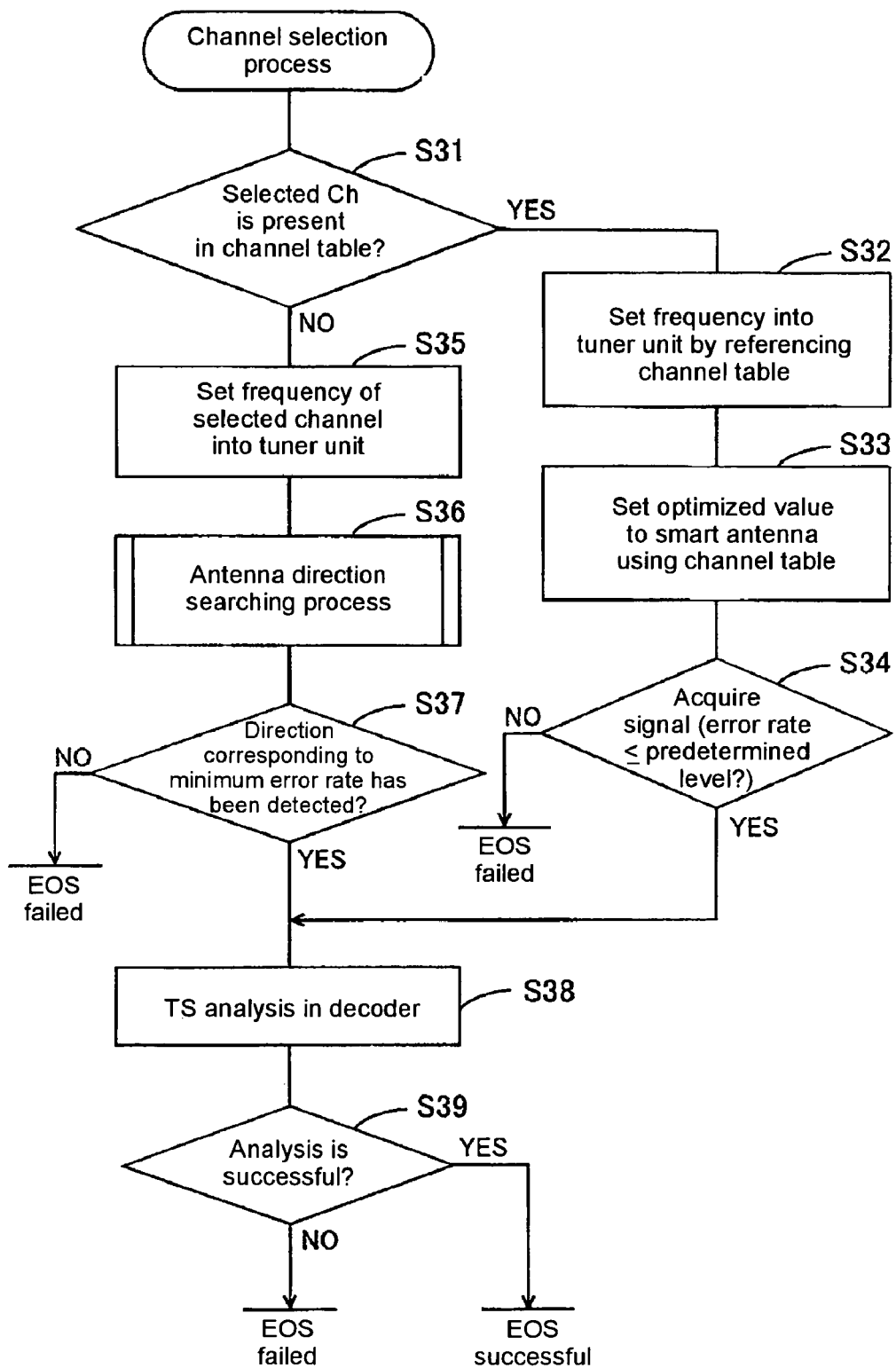
FIG. 8 is a flow chart representing a control operation (channel selection process) that is executed when, for example, a channel has been selected.

FIG. 8 is a flow chart representing a control operation (channel selection process) that is executed when, for example, a channel has been selected.

With reference to FIG. 8, after the channel selection process is started, it is first determined whether a selected channel is present in the channel table 29*a*. More specifically, for example, it is determined whether the state of the signal reception on the channel selected in the channel table 29*a* is "O" (step S31). In the event that the selected channel is present in the channel table 29*a* and hence the result of the determination at step S31 is affirmative, then a frequency corresponding to a channel number (virtual channel number) of the channel selected by referring to the channel table 29*a* is set into the tuner unit (step S32). Subsequently, an optimum receive direction on the channel selected by referring to the channel table 29*a* is set into the smart antenna unit 10 (step S33). Then, it is determined whether a satisfactory television broadcast signal has been acquired. For example, it is determined whether the minimum error rate corresponding to the receive direction set at step S33 is less than the predetermined error rate (step S34).

Alternatively to the above, in the event that the selected channel is not present in the channel table 29*a* and hence the result of the determination at step S31 is negative, then a frequency corresponding to the selected channel is set into the tuner unit (step S35). Subsequently, the antenna direction searching process shown in FIG. 6 is executed (step S36). Then, it is determined whether a directivity direction corresponding to the minimum error rate on the selected channel has been detected. For example, it is determined whether the result of the determination at step S17 executed in the antenna direction searching process at step S36 is affirmative (step S37).

In the event that a satisfactory television broadcast signal has been acquired and hence the result of the determination at step S34 is affirmative or that a directivity direction corresponding to the minimum error rate has been detected and hence the result of the determination at step S37 is affirmative, then the television broadcast signal (TS packets contained in a terrestrial digital broadcast signal, for example) is analyzed by the decoder 24 (step S38). Subsequently, it is determined whether the analysis of the TS packets at step S38 is successful (step S39). In the event that the result of the determination at step S39 is affirmative, then it is determined that the channel selection process is successful, and the present routine is terminated. Alternatively, in the event that the result of the determination at step S39 is negative, then it is determined that the channel selection process is faulty, and the present routine is terminated.

The channel selection process shown in FIG. 8 corresponds to a channel selection section, and is implemented as a function of the control section 30. According to the channel selection section, in the event of channel selection, a frequency corresponding to a selected channel is set into the tuner unit. Further, an optimum receive direction of the smart antenna unit 10 on the selected channel is acquired from the channel table 29a, and is set into the smart antenna unit 10.

Figure 9:
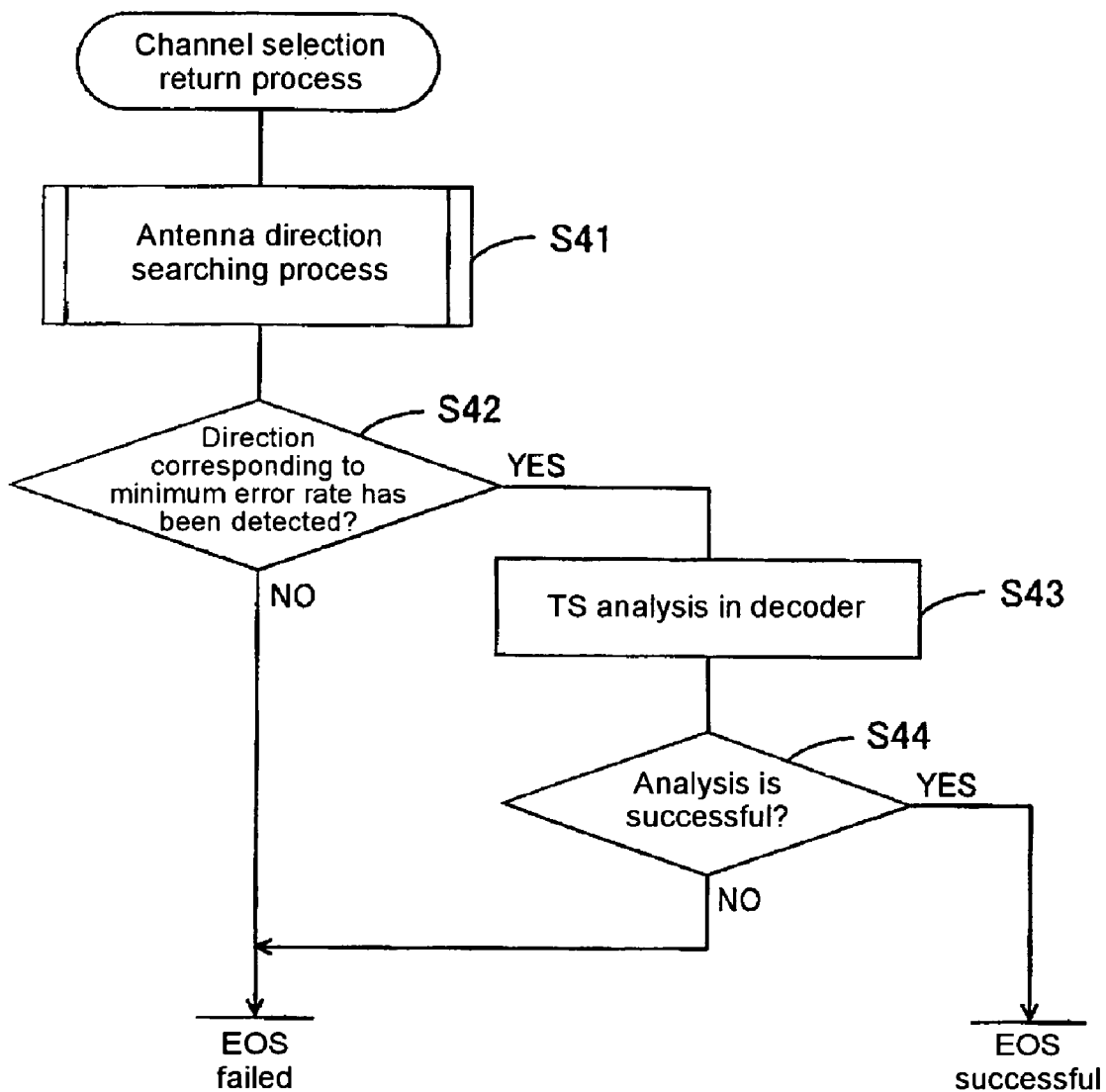
FIG. 9 is a flow chart representing a control operation (channel selection return process) that is executed when, for example, the channel selection process shown in FIG. 8 has failed.

FIG. 9 is a flow chart representing a control operation (channel selection return process) that is executed when, for example, the channel selection process shown in FIG. 8 has failed;

With reference to FIG. 9, first, when the channel selection return process is started, the antenna direction searching process shown in FIG. 6 is executed (step S41). Subsequently, it is determined whether a directivity direction corresponding to a minimum error rate has been detected in the selected channel. For example, it is determined whether the result of the determination at step S17 of the antenna direction searching process executed at step S41 is affirmative (step S42). In the event that the directivity direction corresponding to the minimum error rate has been detected, and hence the result of the determination at step S42 is affirmative, then the television broadcast signal (TS packets contained in a terrestrial digital broadcast signal, for example) is analyzed by the decoder 24 (step S43). Subsequently, it is determined whether the analysis of the TS packets at step S43 is successful (step S44). In the event that the analysis of the TS packets is successful and hence the result of the determination at step S44 is affirmative, then it is determined that the channel selection return process is successful, the present routine is terminated. Otherwise, in the event that the result of the determination at step S42 or S44 is negative, then it is determined that the channel selection return process has failed, and the present routine is terminated.

The channel selection return process shown in FIG. 9 is implemented as a function of the control section 30.

Figure 10:
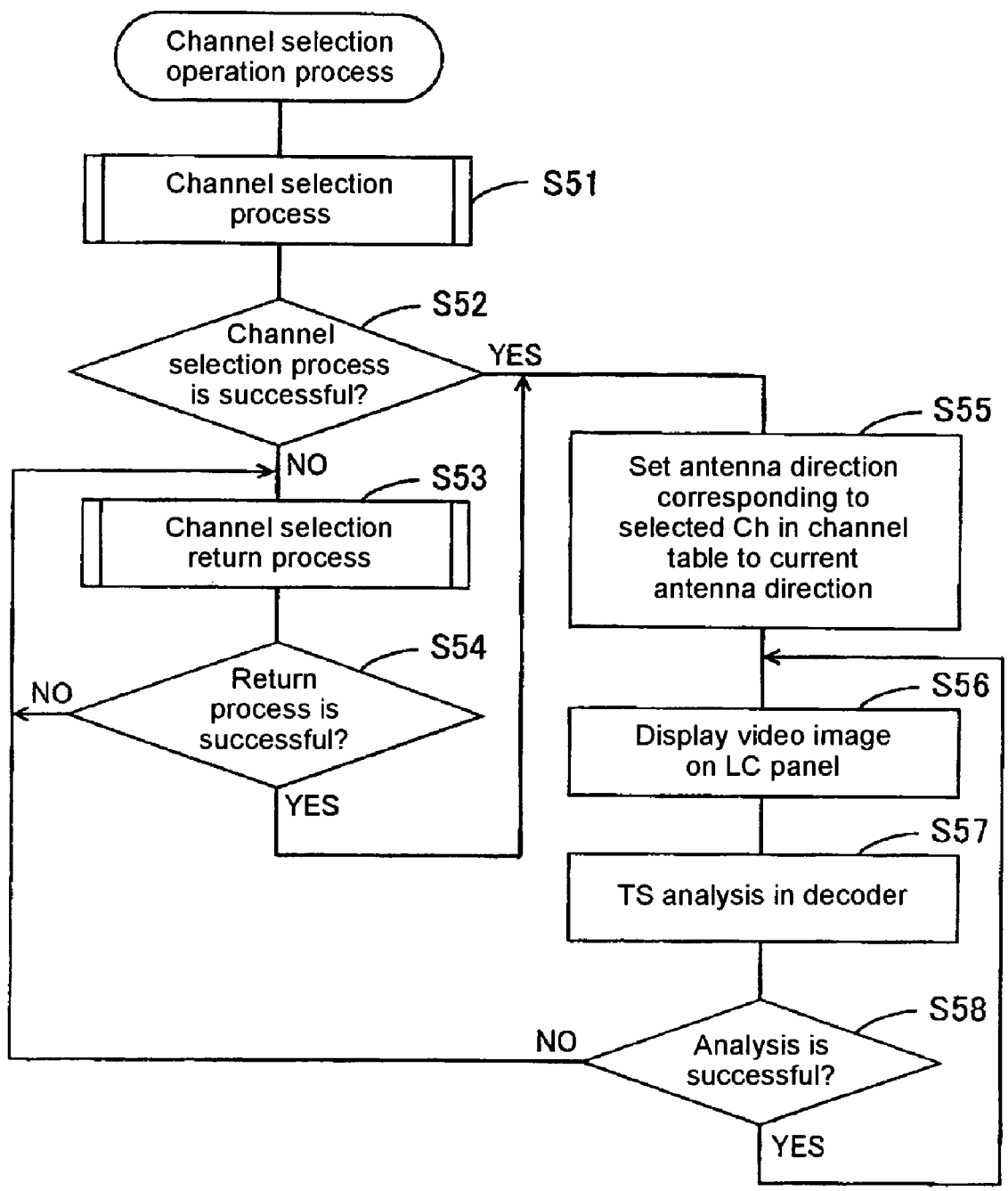
FIG. 10 is a flow chart representing a control operation (channel selection operation process) that is executed for channel selection in an event other than the event that channel up/down keys of a remote controller are operated by a user.

FIG. 10 is a flow chart representing a control operation (channel selection operation process) that is executed for channel selection performed without relying on the channel up/down operation in which the channel up/down keys 40b and 40c of the remote controller 40 is operated. For example, the process is executed in, for example, an event where the channel keys 40a is depressed by the user in a power-on event where a last channel (channel in a power-off event) is selected, and an event where the auto-scanning process for selection of a retransmission channel terminates.

With reference to FIG. 10, first, when the channel selection operation process is started, the channel selection process shown in FIG. 8 is executed (step S51). Subsequently, it is determined whether the channel selection process executed at step S51 is successful (step S52). In the event that the channel selection process has failed and hence the result of the determination at step S52 is negative, then the channel selection return process shown in FIG. 9 is executed (step S53). Subsequently, it is determined whether the channel selection return process executed at step S53 is successful (step S54).

In the event that the channel selection process is successful and hence the result of the determination at step S52 is affirmative or that the channel selection return process is successful and hence the result of the determination at step S54 is affirmative, an optimum receive direction of a selected channel stored in the channel table 29a is set to the current receive direction of the smart antenna unit 10 (step S55). Subsequently, a television broadcast signal is received on the selected channel and is monitor-output (video image and audio sounds) (step S56). Then, the television broadcast signal (TS packets contained in a terrestrial digital broadcast signal, for example) is analyzed by the decoder 24 (step S57). Then, it is determined whether the analysis of the TS packets at step S57 is successful (step S58).

In the event that the analysis of the TS packets is successful and hence the result of the determination at step S58 is affirmative, then step S56 and the subsequent steps are iteratively executed. Otherwise, in the event that the result of the determination at step S54 or S58 is negative, then step S53 and the subsequent steps are iteratively executed.

The channel selection operation process is implemented as a function of the control section 30.

Figure 11:
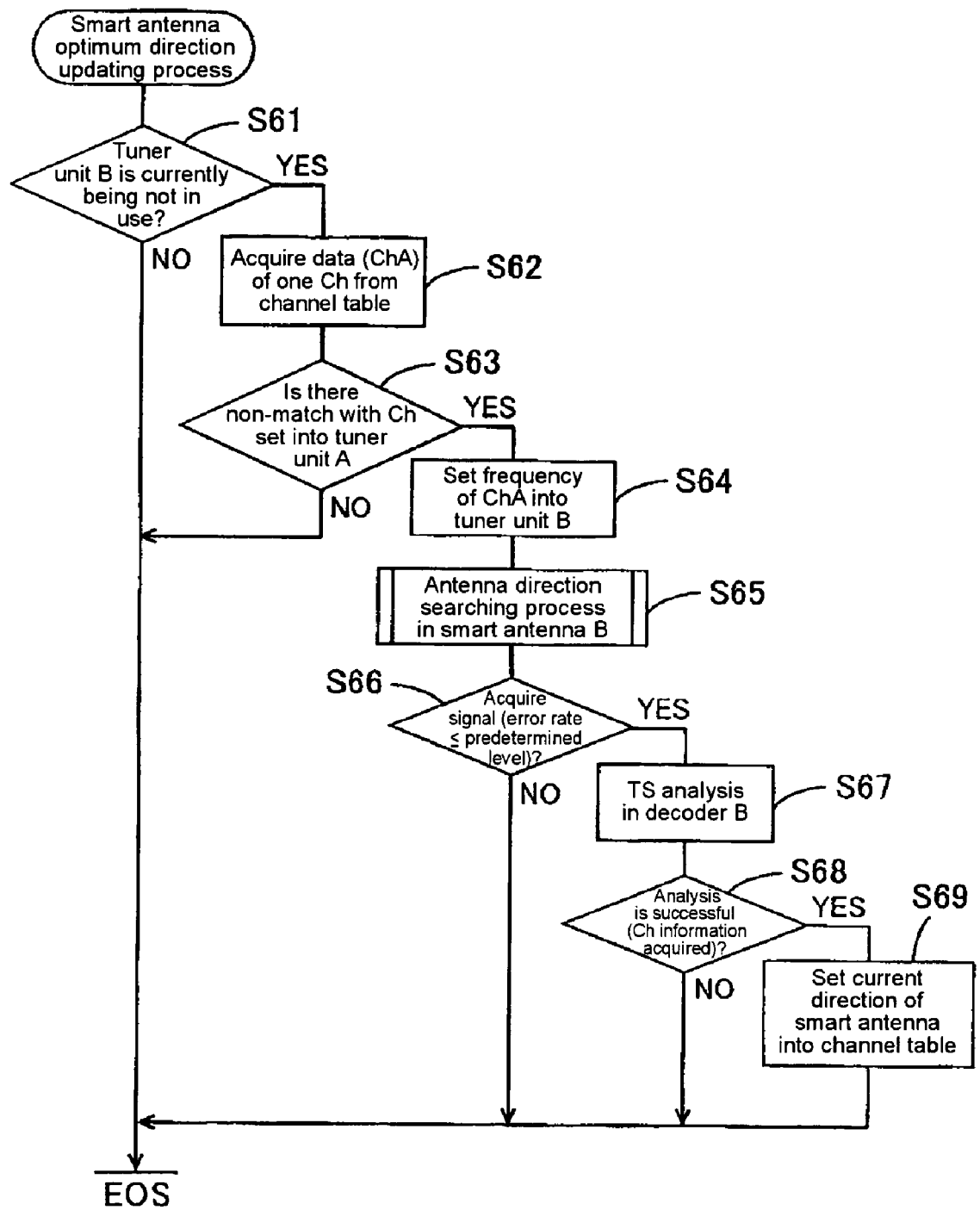
FIG. 11 is a flow chart representing a control operation (optimum direction updating process) that is executed in parallel with the channel selection operation process, which is shown in FIG. 10, to serially update the optimum receive direction of the smart antenna unit corresponding to each of channels stored in the channel table.

FIG. 11 is a flow chart representing a control operation (optimum direction updating process) that is executed in parallel with the channel selection operation process, which is shown in FIG. 10, to serially update optimum receive directions of the smart antenna unit 10 on the respective channels stored in the channel table 29. The optimum direction updating process is iteratively execution at a predetermined cycle time.

With reference to FIG. 11, first, when the optimum direction updating process is started, it is determined whether a tuner unit of a system currently being not in use is present. For example, in the case the tuner unit A is ordinarily used in precedence to the other, it is determined whether the tuner unit B is currently being in use or non-use (step S61). In the event that the tuner unit B is currently being not in use and hence the result of the determination at step S61 is affirmative, then data on one arbitrary channel (ChA) of which the state of the signal reception from the channel table 29a is "O" is acquired (referentially accessed). ChA is, for example, a channel oldest in data update in the channel table 29a, or a channel oldest in data update among those excluding a previously acquired channel in the event that the oldest channel is set into the tuner unit A (step S62). Subsequently, it is determined whether there is a non-match between ChA acquired at step S62 and the channel set in the tuner unit A (step S63). In the event that there is a non-match with the channel set into the tuner unit A and hence the result of the determination at step S63 is affirmative, a frequency corresponding to ChA is set into the tuner unit B (step S64). Then, with the use of the smart antenna 10b (more specifically, with the use of the tuner unit B), the antenna direction searching process shown in FIG. 6 is executed (step S65). Then, it is determined whether a satisfactory television broadcast signal has been acquired. For example, the result of the determination at step S17 of the antenna direction searching process executed at step S65 (the determination as to whether the minimum error rate is less than the predetermined error rate) is affirmative (step S66). In the event that a satisfactory television broadcast signal has been able to be acquired and hence the result of the determination at step S66 is affirmative, then the television broadcast signal (TS packets contained in a terrestrial digital broadcast signal, for example) is analyzed by the decoder 24b (step S67). Subsequently, it is determined whether the analysis of the TS packets at step S67 is successful (step S68). In the event that the analysis of the TS packets is successful and hence the result of the determination at step S68 is affirmative, the following is performed. On ChA of the channel table 29a, the current direction of the smart antenna unit 10 (the direction corresponding to the minimum error rate set at step S18 shown in FIG. 6, for example) is updated (stored) as an optimum receive direction of the smart antenna unit 10, and the present routine is terminated (step S69). Otherwise, in the event that the result of the determination at step S61, S63, or S66 is negative, then the present routine is also terminated.

In accordance with iterative executions of the optimum direction updating process, the optimum receive directions of the smart antenna unit 10 on the respective channels stored in the channel table 29a are always or all time maintained to be latest.

The optimum direction updating process shown in FIG. 11 corresponds to an optimum direction updating section and is implemented as a function of the control section 30. According to the optimum direction updating section, in the event that a tuner unit of a system currently being not in use is present, the optimum receive direction of the smart antenna unit 10 on a channel other than that selected in a tuner unit of a system currently being in use is serially updated by the use of the tuner unit of the system currently being not in use.

Figure 12:
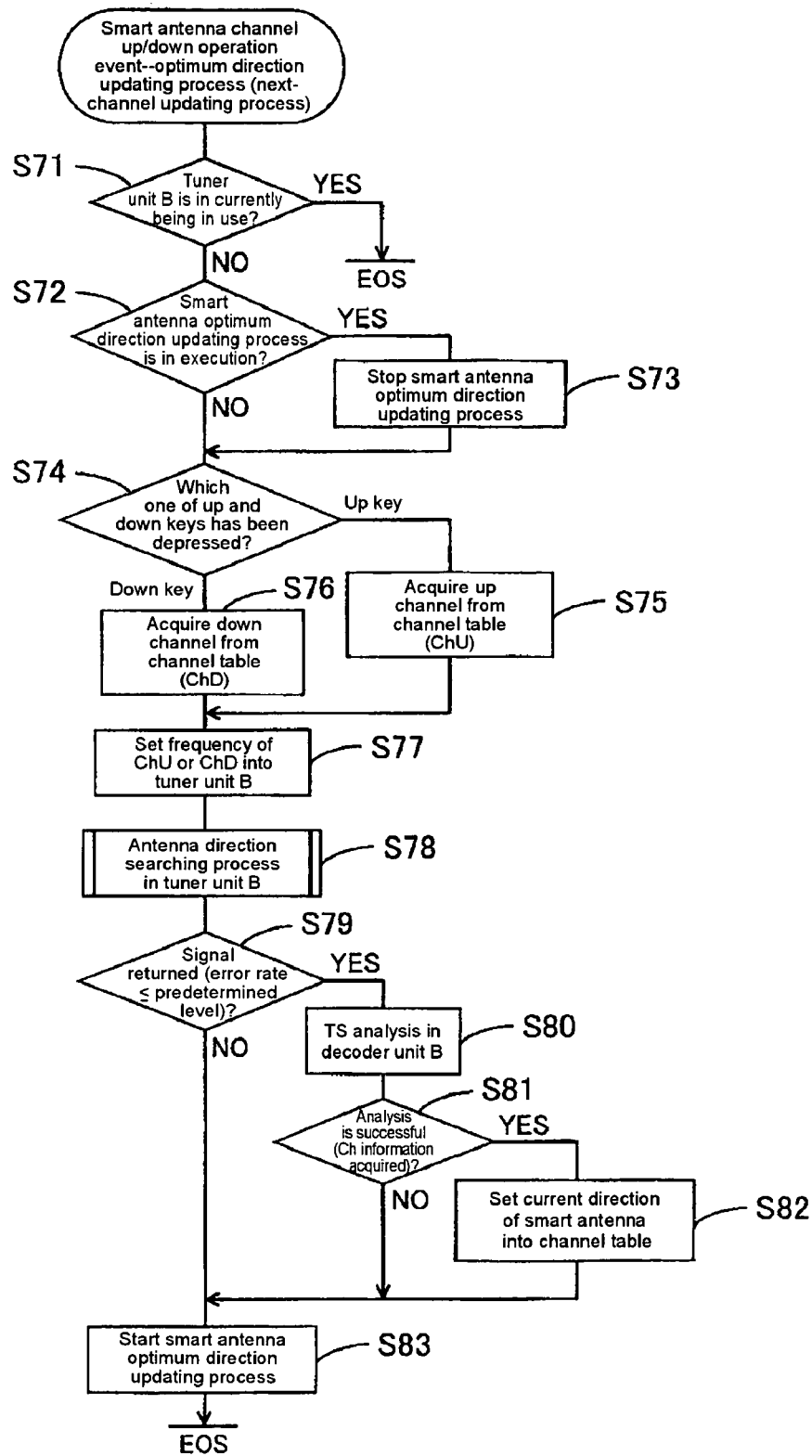
FIG. 12 is a flow chart representing a control operation (next-channel updating process) that is executed for channel selection in the event that the channel up/down keys of the remote controller have been operated by the user in order to serially update optimum receive directions of the smart antenna unit on respective channels stored in the channel table.

FIG. 12 is a flow chart representing a control operation (a channel up/down operation event—optimum direction updating process and a next-channel updating process) that is executed for channel selection in the event that the channel up/down keys 40b and 40c of the remote controller 40 have been operated by the user. The control operation is executed in order to update the optimum receive directions of the smart antenna unit 10 on the respective channels stored in the channel table 29a. According to the channel selection executed in response to the user operation of the channel up/down keys 40b and 40c, virtual channel numbers (or channel numbers of which the states of the signal receptions are each set to "O") in the channel table 29a are selected in their arrangement order.

With reference to FIG. 12, first, when the next-channel updating process is started, it is determined whether the tuner unit different from the tuner unit currently being in use for channel selection is currently being in use. For example, in the case channel selection is performed in the tuner unit A, it is determined whether the tuner unit B is currently being in use (step S71). In the event that the tuner unit B is currently being in use and hence the result of the determination at step S71 is affirmative, then the present routine is terminated. However, in the event that the tuner unit B is currently being not in use and hence the result of the determination at step S71 is negative, then it is determined whether the optimum direction updating process shown in FIG. 11 is currently in execution (step S72). In the event that the optimum direction updating process is currently in execution and hence the result of the determination at step S72 is affirmative, then the optimum direction updating process is temporarily stopped or suspended (step S73). Subsequently to step S73 or in the event that determination at step S72 is negative, then it is determined which one of the channel up/down keys 40b and 40c has been depressed (step S74).

Figure 13:
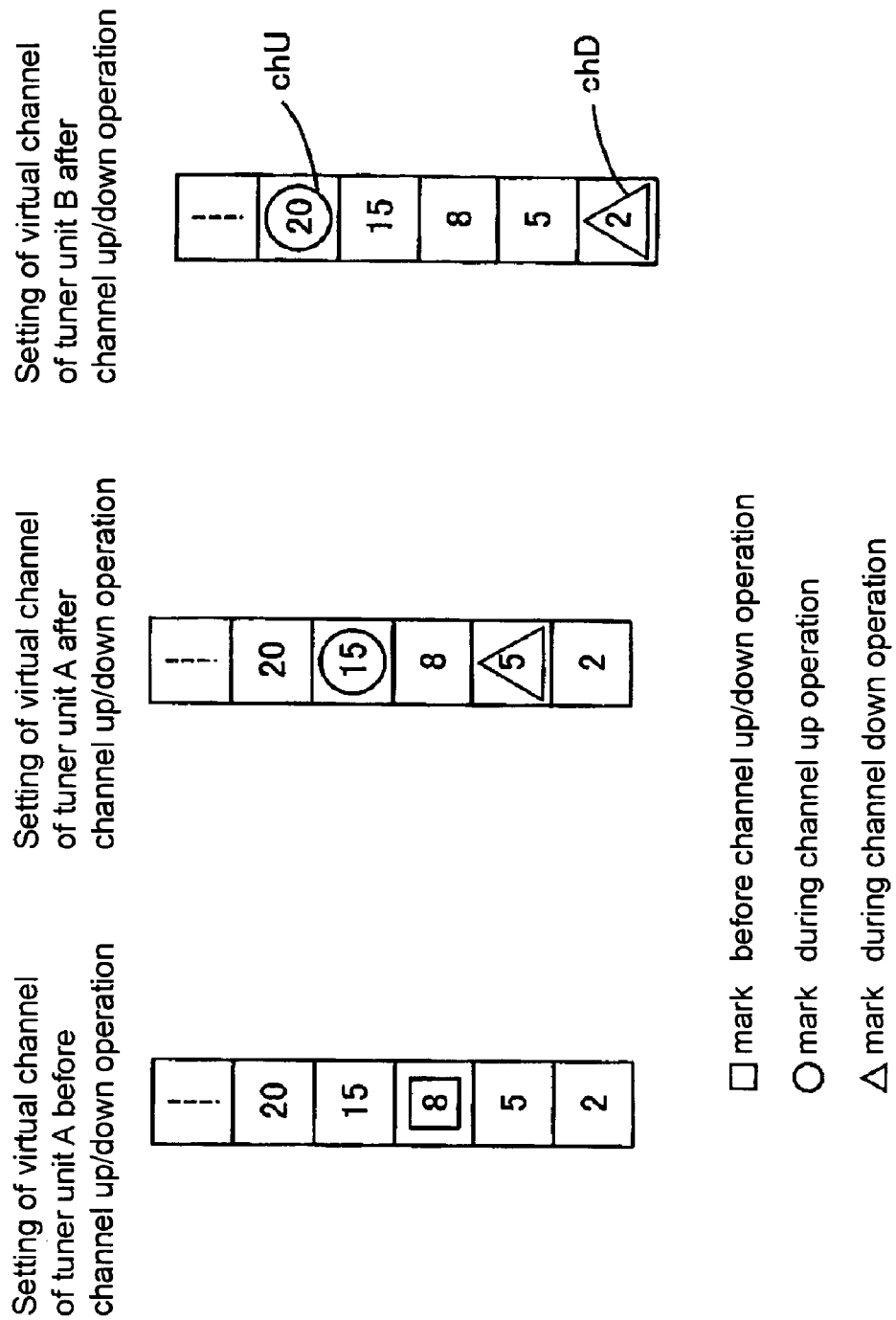
FIG. 13 is a view exemplifying a channel that is selected in a next channel up/down operation.

In the event that, at step S74, it is determined whether the channel up key 40b has been depressed, then an up-channel (ChU) is acquired from the channel table 29a. More specifically, as shown by a "O" mark in FIG. 13, in the event that the channel up/down operation is a channel up operation performed through depression of the channel up key 40b, then the up-channel (ChU), which is selected through the next channel up operation, is acquired from the channel table 29a (step S55). Otherwise, in the event that, at step S74, it is determined that the channel down key 40c has been depressed, then a down-channel (ChD) is acquired from the channel table 29a. More specifically, as shown by a "□" mark in FIG. 13, in the event that the channel up/down operation is a channel down operation performed through depression of the channel down key 40c, then the down-channel (ChD), which is selected through the next channel down operation, is acquired from the channel table 29a (step S76).

Subsequently to step S75 or S76, a frequency corresponding to the ChU or ChD is set into the tuner unit B (step S77). Then, with the use of the smart antenna 10b (more specifically, with the use of the tuner unit B), the antenna direction searching process shown in FIG. 6 is executed (step S78). Then, it is determined whether a satisfactory television broadcast signal has been acquired. For example, the result of the determination at step S17 of the antenna direction searching process executed at step S78 (the determination as to whether the minimum error rate is less than the predetermined error rate) is affirmative (step S79). In the event that a satisfactory television broadcast signal has been able to be acquired and hence the result of the determination at step S79 is affirmative, then the television broadcast signal (TS packets contained in a terrestrial digital broadcast signal, for example) is analyzed by the decoder 24b (step S80). Subsequently, it is determined whether the analysis of the TS packets at step S80 is successful (step S81). In the event that the analysis of the TS packets is successful and hence the result of the determination at step S81 is affirmative, the following is performed. On ChU or ChD of the channel table 29a, the current direction of the smart antenna unit 10 (the direction corresponding to the minimum error rate set at step S18 shown in FIG. 6, for example) is updated (stored) as an optimum receive direction of the smart antenna unit 10, and the present routine is terminated (step S82). Otherwise, subsequent step S82 or in the event that the result of the determination at step S79 or 81 is negative, then the optimum direction updating process shown in FIG. 11 is started and the present routine is terminated.

In accordance with execution of the next-channel updating process, the optimum receive direction of the smart antenna unit 10 on the channel selected through the next channel up/down operation is updated with priority, and the respective channels are always or all time maintained to be latest. Further, in the event that successive identical channel up/down operations are performed, the optimum receive direction of the smart antenna unit 10 on the selected channel are securely updated The next-channel updating process shown in FIG. 12 corresponds to a next-channel updating section and is implemented as a function of the control section 30. According to the next-channel updating section, in the case where channel selection is performed through the channel up/down operation, the updating process of the channel table 29a by the optimum direction updating section (the optimum direction updating process shown in FIG. 11) is suspended. Then, an optimum receive direction of the smart antenna unit 10 on a channel to be selected through a next channel up/down operation is updated in precedence to the next channel up/down operation by using a tuner unit currently being not in use. In the event that an embodiment in which the optimum direction updating process shown in FIG. 11 is not inherently executed, the optimum direction updating section (optimum direction updating process shown in FIG. 11) need not be suspended.

Figure 14:
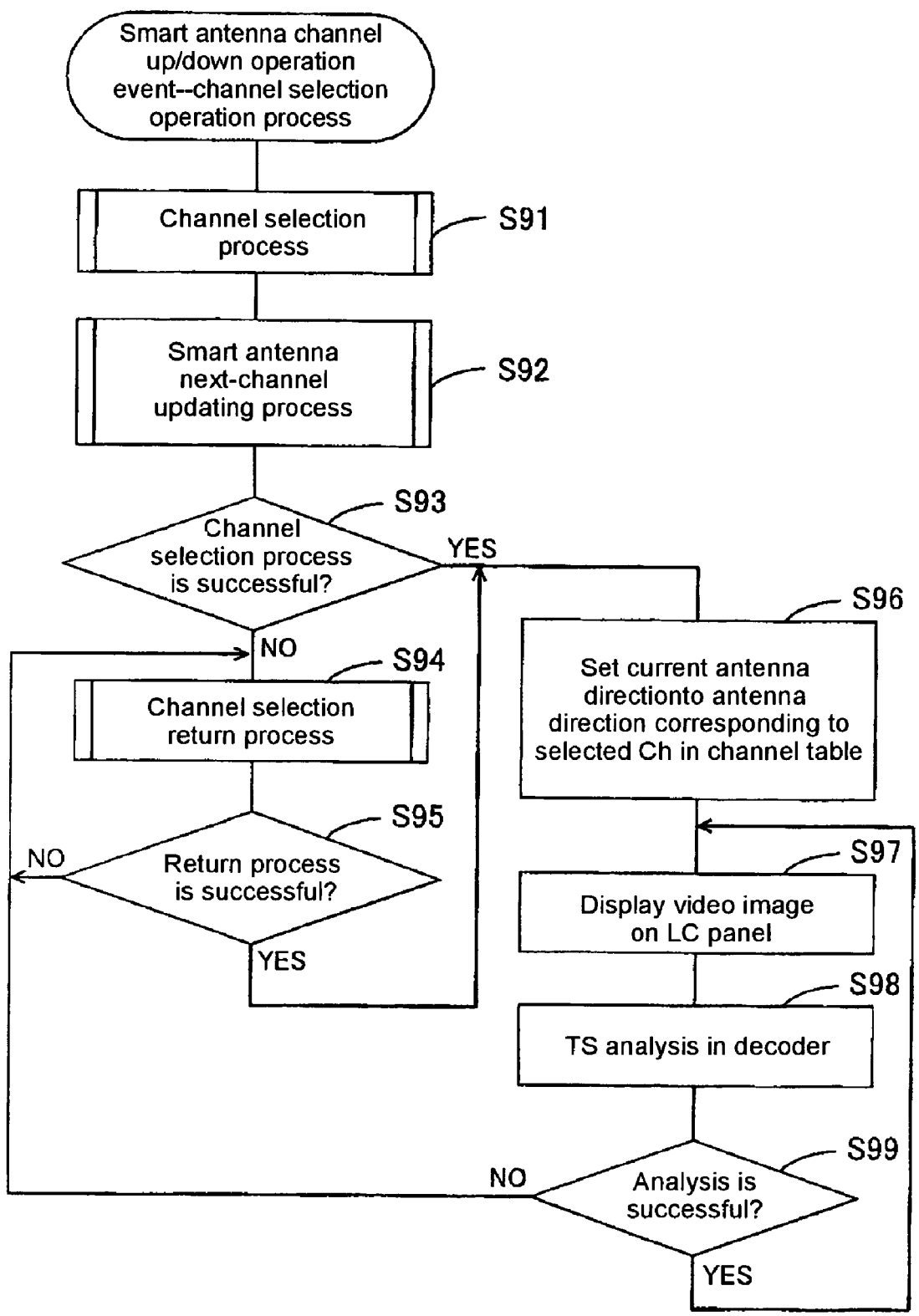
FIG. 14 is a flow chart representing a control operation (channel up/down operation event—channel selection operation process) that is executed in channel selection in the event that the channel up/down keys of the remote controller have been operated by the user.

FIG. 14 is a flow chart representing a control operation (channel up/down operation event—channel selection operation process) that is executed in channel selection in response to the user operation of the channel up/down keys 40b and 40c of the remote controller 40.

With reference to FIG. 14, first, when the channel up/down operation event—channel selection operation process is started, the channel selection process shown in FIG. 8 is executed (step S91). Subsequently, the next-channel updating process shown in FIG. 12 is executed (step S92). Then, it is determined whether the channel selection process executed at step S91 is successful (step S93). In the event that the channel selection process has failed and hence the result of the determination at step S93 is negative, then the channel selection return process shown in FIG. 9 is executed (step S94). Subsequently, it is determined whether the channel selection return process executed at step S53 is successful (step S94). Then it is determined whether the channel selection return process executed at step S94 is successful (step S95).

In the event that the channel selection process is successful and hence the result of the determination at step S93 is affirmative or that the channel selection return process is successful and hence the result of the determination at step S95 is affirmative, an optimum receive direction of a selected channel stored in the channel table 29a is set to the current receive direction of the smart antenna unit 10 (step S96). Subsequently, a television broadcast signal is received on the selected channel and is monitor-output (video image and audio sounds) (step S97). Then, the television broadcast signal (TS packets contained in a terrestrial digital broadcast signal, for example) is analyzed by the decoder 24 (step S98). Then, it is determined whether the analysis of the TS packets at step S98 is successful (step S99).

In the event that the analysis of the TS packets is successful and hence the result of the determination at step S99 is affirmative, then step S97 and the subsequent steps are iteratively executed. Alternatively, in the event that the result of the determination at step S95 or S99 is negative, then step S94 and the subsequent steps are iteratively executed.

The channel up/down operation event—channel selection operation process shown in FIG. 14 is implemented as a function of the control section 30.

(3) Modified Example

In the respective embodiment described above, the television receiver 20a includes two tuner units. However, the television receiver 20a includes three or more tuner units.

Suppose now that multiple tuner units currently being not in use are available in the event of execution of the optimum direction updating process shown in FIG. 11. In such a case, optimum receive directions, which are stored in the channel table 29a, of the smart antenna unit 10 on the respective channels may be updated by being shared among the multiple tuner units currently being not in use. In this manner, the updating process is implemented even more speedily, compared to the case where two tuner units are used.

Further, suppose that multiple tuner units currently being not in use are available in the event of execution of the next-channel updating process shown in FIG. 12. In such a case, regardless of whether the channel up/down operation is a channel up operation or channel down operation, the updating process may be performed by using the multiple tuner units respectively not using an optimum receive direction of the smart antenna unit 10 on respective channels that are selected through a next channel up operation and a next channel down operation. Thereby, even in the case where any one of the next channel up and down operations is performed, the optimum receive direction of the smart antenna unit 10 on the channel that is selected through the next channel up/down operation is securely updated.

(4) Conclusion

As described above, according to the present embodiment, the optimum receive direction of the smart antenna unit 10 is always maintained to be latest. Consequently, there is provided a television receiver 20a in which channel selection can be always performed corresponding to the optimum receive direction of the smart antenna unit 10 in the event of channel selection, and the channel selection operation can be performed in a reduced period of time.

More specifically, the optimum receive directions of the smart antenna unit 10 on the respective channels stored in the channel table 29a are always maintained to be latest. Hence, in the event of channel selection, executions of searching operations by the antenna direction searching section (the antenna direction searching process shown in FIG. 6) for searching for optimum receive directions are minimized.

Further, in the television receiver 20a including three or more tuner units, in which multiple tuner units currently being not in use are available, the channel table 29a are quickly updated. Hence, executions of searching operations by the antenna direction searching section for searching for optimum receive directions are even more minimized.

Further, according to the present embodiment, in the event that channel selection is performed through the channel up/down operation, the optimum receive direction of the smart antenna unit 10 on a channel that is selected through the next channel up/down operation is updated with precedence. Hence, the embodiment is enabled to satisfactorily operate in response to the event where successive channel up/down operations are carried out by the user.

More specifically, since the optimum receive direction of the smart antenna unit 10 on the channel to be subsequently selected through successive identical channel up/down operations is securely updated, the configuration is enabled to satisfactorily operate in response to the event where the identical channel up/down operations are carried out by the user.

Further, in the television receiver 20a including three or more tuner units, in which multiple tuner units currently being not in use are available, the channel table 29a are updated quickly or in a reduced period of time. Hence, the configuration is securely enabled to satisfactorily operate in response to the event where the successive channel up/down operations are carried out by the user.

Further, preferably, the configuration may be formed to operate as a processing method executable in the television body 20 (thin television set 100).

More specifically, a television receiving method for a television receiver including at least two tuner units respectively connecting to smart antenna may be configured to include an optimum direction updating step. In this step, in the case where a tuner unit currently being not in use is present, an optimum receive direction of the smart antenna unit 10 on a channel other than a channel selected in a tuner unit currently being in use is serially updated by using the tuner unit currently being not in use.

Further, the television receiving method for a television receiver including at least two tuner units respectively connecting to smart antenna may be configured to include a next-channel updating step. In this step, in the case where a tuner unit currently being not in use is present in the event of channel selection through the channel up/down operation, the optimum receive direction of the smart antenna unit 10 on a channel to be selected through a next channel up/down operation is updated in precedence to the next channel up/down operation by using a tuner unit currently being not in use.

Thus, the technique of the embodiment described above is not only applicable to an apparatus including physical components, but is also applicable to a method for the apparatus. Hence, there should be no difference even in that the above-described configuration is effective also as the method, such that a television receiving method for the television receiver having effects to those described above can be provided.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A television receiver comprising:
at least two tuner units that respectively connect to multidirectional antennas capable of electrically switching a directivity of a receiving radio wave and select a television broadcast signal corresponding to a channel selected by a user,
an antenna direction searching section that searches all azimuthal directions while serially switching a directivity direction of the multidirectional antenna and that sets an optimum receive direction into the multidirectional antenna;
an auto-scanning section that determines in units of each channel whether the optimum receive direction has been set by the antenna direction searching section into the multidirectional antenna and that, when a predetermined signal has been able to be demultiplexed from a television broadcast signal on a channel corresponding to the multidirectional antenna set to the optimum receive direction among respective channels, stores the optimum receive direction of the multidirectional antenna on the channel into a channel table,
a channel selection section that, in the event of channel selection, sets a frequency corresponding to a selected channel into a predetermined tuner unit, acquires an optimum receive direction of the multidirectional antenna from the channel table, and sets the optimum receive direction into the multidirectional antenna; and
an optimum direction updating section that operates, while one of the tuner unit is not in use, to update an optimum receive direction of the multidirectional antenna on a channel other than a channel selected in the other tuner unit,
wherein the optimum direction updating section serially updates optimum receive directions of the multidirectional antenna on the respective channels in parallel with channel selection operations of the channel selection section, the optimum receive directions being stored in the channel table.

2. A television receiver according to claim 1, wherein, when a plurality of tuner units currently being not in use are present, the optimum direction updating section operates in a manner that the optimum receive directions of the multidirectional antenna stored in the channel table on the respective channels are updated by being shared among the plurality of tuner units currently being not in use.

3. A television receiver according to claim 1, further comprising a next-channel updating section that operates in a manner that, when the channel selection is performed through a channel up/down operation performed by the user to select a channel in order of an arrangement of the channels in the channel table, an updating process of the channel table by the optimum direction updating section is suspended, and an optimum receive direction of the multidirectional antenna on a channel to be selected through a next channel up/down operation is updated in precedence to the next channel up/down operation by using a tuner unit currently being not in use.

4. A television receiver according to claim 3, wherein the next-channel updating section operates in a manner that, when the channel up/down operation is a channel up operation, an optimum receive direction of the multidirectional antenna on a channel to be selected through a next channel up operation is updated; whereas, when the channel up/down operation is a channel down operation, an optimum receive direction of the multidirectional antenna on a channel to be selected through a next channel down operation is updated.

5. A television receiver according to claim 3, wherein the next-channel updating section operates in a manner that, when a plurality of tuner units currently being not in use are present, regardless of the channel up/down operation, optimum receive directions of the multidirectional antenna on a respective channel to be selected through a next channel up operation and on a respective channel to be selected through a next channel down operation are respectively updated by using the plurality of tuner units currently being not in use.

6. A television receiver comprising:
at least two tuner units that respectively connect to multidirectional antennas capable of electrically switching a directivity of a receiving radio wave and select a television broadcast signal corresponding to a channel selected by a user,
an antenna direction searching section that searches all azimuthal directions while serially switching a directivity direction of the multidirectional antenna and that sets an optimum receive direction into the multidirectional antenna;
an auto-scanning section that determines in units of each channel whether the optimum receive direction has been set by the antenna direction searching section into the multidirectional antenna and that, when a predetermined signal has been able to be demultiplexed from a television broadcast signal on a channel corresponding to the multidirectional antenna set to the optimum receive direction among respective channels, stores the optimum receive direction of the multidirectional antenna on the channel into a channel table,
a channel selection section that, in the event of channel selection, sets a frequency corresponding to a selected channel into a predetermined tuner unit, acquires an optimum receive direction of the multidirectional antenna on the selected channel from the channel table, and sets the optimum receive direction into the multidirectional antenna; and
a next-channel updating section that operates in a manner that, when the channel selection is performed through a channel up/down operation performed by the user to select a channel in order of an arrangement of the channels in the channel table, an updating process of the channel table by the optimum direction updating section is suspended; when the channel up/down operation is a channel up operation, an optimum receive direction of the multidirectional antenna on a channel to be selected through a next channel up/down operation is updated in precedence to the next channel up/down operation by using a tuner unit currently being not in use; when the channel up/down operation is a channel down operation, an optimum receive direction of the multidirectional antenna on a channel to be selected through a next channel down operation is updated in precedence to the next channel down operation using the tuner unit currently being not in use, an optimum direction updating section that operates, while one of the tuner unit is not in use, to update an optimum receive direction of the multidirectional antenna on a channel other than a channel selected in the other tuner unit, wherein the optimum direction updating section serially updates optimum receive directions of the multidirectional antenna on the respective channels in parallel with channel selection operations of the channel selection section, the optimum receive directions being stored in the channel table; and the television receiver is provided in a thin television set.

* * * * *